(12) United States Patent
Batchelder et al.

(10) Patent No.: US 11,079,904 B2
(45) Date of Patent: Aug. 3, 2021

(54) TECHNOLOGIES FOR INDICATING THIRD PARTY CONTENT AND RESOURCES

(71) Applicant: AppEsteem Corporation, Bellevue, WA (US)

(72) Inventors: Dennis Batchelder, Seattle, WA (US); Hong Jia, Bellevue, WA (US); Arunabh Trivedi, Mumbai (IN)

(73) Assignee: AppEsteem Corporation, Bellevue, WA (US)

( * ) Notice: Subject to any disclaimer, the term of this patent is extended or adjusted under 35 U.S.C. 154(b) by 0 days.

(21) Appl. No.: 16/541,205

(22) Filed: Aug. 15, 2019

(65) Prior Publication Data
US 2020/0218434 A1    Jul. 9, 2020

Related U.S. Application Data

(63) Continuation of application No. 16/240,950, filed on Jan. 7, 2019.

(51) Int. Cl.
| | | |
|---|---|---|
| *G06F 3/0482* | (2013.01) | |
| *G06F 3/0484* | (2013.01) | |
| *G06F 8/30* | (2018.01) | |
| *G06F 8/38* | (2018.01) | |
| *G06F 16/957* | (2019.01) | |

(52) U.S. Cl.
CPC ........ *G06F 3/0482* (2013.01); *G06F 3/04842* (2013.01); *G06F 3/04845* (2013.01); *G06F 8/30* (2013.01); *G06F 8/38* (2013.01); *G06F 16/9577* (2019.01)

(58) Field of Classification Search
CPC ....... G06F 3/0482; G06F 3/04845; G06F 8/30
See application file for complete search history.

(56) References Cited

U.S. PATENT DOCUMENTS

| | | |
|---|---|---|
| 7,913,292 B2 | 3/2011 | Hartrell et al. |
| 8,201,244 B2 | 6/2012 | Sun et al. |
| 8,661,260 B2 | 2/2014 | Leonard |
| 8,694,604 B2 | 4/2014 | Cummins et al. |
| 8,762,980 B1 | 6/2014 | Sobel et al. |
| 8,850,581 B2 | 9/2014 | Wang et al. |

(Continued)

OTHER PUBLICATIONS

Andy-h, "CSS to obfuscate text until you hover over it," Mar. 21, 2017, https://snippets.cacher.io/snippet/4b96eeb5222db7b74249.*

(Continued)

*Primary Examiner* — Ryan Barrett
(74) *Attorney, Agent, or Firm* — Schwabe, Williamson & Wyatt, P.C.

(57) ABSTRACT

Methods, systems, and storage media for distinguishing third party resources (TPRs) with respect to first party resources (FPRs) are provided. A client system generates and renders a graphical user interface (GUI) comprising one or more graphical objects in a client application. The client system identifies resources corresponding to individual graphical objects. The client system communicates the identified resources to a verification service, and obtains indicators indicating TPRs to be distinguished from FPRs. The client system applies a distinguishing effect to the TPRs based on the received indicators. Other embodiments may be described and/or claimed.

18 Claims, 6 Drawing Sheets

(56) References Cited

U.S. PATENT DOCUMENTS

| | | | |
|---|---|---|---|
| 8,887,245 B1 | 11/2014 | Wiltzius et al. | |
| 9,774,626 B1 | 9/2017 | Himler et al. | |
| 9,967,236 B1 | 5/2018 | Ashley et al. | |
| 10,108,306 B2 | 10/2018 | Khoo et al. | |
| 10,437,988 B1* | 10/2019 | Newstadt | G06F 21/84 |
| 2007/0234209 A1 | 10/2007 | Williams | |
| 2008/0301802 A1 | 12/2008 | Bates et al. | |
| 2008/0303689 A1* | 12/2008 | Iverson | H04L 63/1441 340/6.1 |
| 2009/0077373 A1* | 3/2009 | Kramer | H04L 63/1483 713/155 |
| 2009/0310165 A1 | 12/2009 | Olsson et al. | |
| 2011/0138441 A1 | 6/2011 | Neystadt et al. | |
| 2012/0144489 A1 | 6/2012 | Jarrett et al. | |
| 2013/0276105 A1 | 10/2013 | Hinchliffe et al. | |
| 2014/0189859 A1 | 7/2014 | Ramanan et al. | |
| 2014/0331119 A1 | 11/2014 | Dixon et al. | |
| 2015/0095759 A1 | 4/2015 | Olenick et al. | |
| 2015/0205767 A1* | 7/2015 | Stekkelpak | G06F 40/103 715/207 |
| 2015/0207804 A1 | 7/2015 | Van Brink et al. | |
| 2015/0281262 A1 | 10/2015 | Cai et al. | |
| 2016/0057167 A1 | 2/2016 | Bach | |
| 2016/0065595 A1 | 3/2016 | Kim et al. | |
| 2016/0259497 A1 | 9/2016 | Foss et al. | |
| 2016/0294846 A1 | 10/2016 | Sharov et al. | |
| 2017/0032505 A1* | 2/2017 | Levieux | G01S 19/13 |
| 2017/0192651 A1* | 7/2017 | Yang | H04L 67/306 |
| 2018/0046944 A1 | 2/2018 | Barnera et al. | |
| 2018/0183820 A1 | 6/2018 | Iyer et al. | |
| 2018/0335928 A1 | 11/2018 | Van Os et al. | |
| 2019/0164196 A1 | 5/2019 | Tang et al. | |
| 2019/0204996 A1 | 7/2019 | Elce et al. | |
| 2019/0340256 A1 | 11/2019 | Kulkarni | |
| 2020/0218433 A1* | 7/2020 | Batchelder | G06F 3/04845 |

OTHER PUBLICATIONS

Zolfagharifard, "Facebook Adds Warnings on Graphic Content That Can 'Shock, Offend and Upset'—But Does the Measure Go Far Enough?", Jan. 13, 2015, https://www.dailymail.co.uk/sciencetec/article-2909087/.

Chandel, "Beginner Guide to HTML Injection", Jul. 21, 2017; https://www.hackingarticles.in/beginner-guide-jtml-injection/.

McNeil, How to Block Ads Like a Pro, Jul. 19, 2018, https://blog.malwarebytes.com.security-world/2018/07//how-to-block-ads-like-a-pro/.

F. Alvarez et al., "Future Media Internet Architecture Reference Model (v1.0)", FMIA-TT Reference Model Outline, White Paper, Mar. 1, 2011 (16 pages).

* cited by examiner

TECHNOLOGIES FOR INDICATING THIRD PARTY CONTENT AND RESOURCES

RELATED APPLICATIONS

The present application claims priority to U.S. application Ser. No. 16/240,950, filed on Jan. 7, 2019, titled "TECHNOLOGIES FOR INDICATING DECEPTIVE AND TRUSTWORTHY RESOURCES", the contents of which are incorporated by reference in its entirety.

FIELD

The present disclosure relates to the technical field of computing, and in particular, to technologies for indicating third party content in graphical user interfaces.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Web browsers render and display webpages and/or web applications in response to user requests. The rendered and displayed webpages and/or applications may include content that is/are links or references to various web resources, such as other content or applications. Some of the content included in the rendered/displayed webpages/applications may be online advertisements ("ads"), which are linked to advertiser resources. Some of these ads may be in the form of web banners (also referred to as "banners ads" or simply "banners"), which are typically graphical ads displayed within a webpage/application. Banner ads may include rich media to incorporate video, audio, animations, buttons, forms, or other interactive elements using, for example, JavaScript, Java applets, HTML5, Adobe Flash, and/or the like. Many banner ads are delivered by one or more ad servers owned and/or operated by an ad network. These banner ads are usually mostly or entirely controlled by the ad network serving the ads, with little or no control by the service or platform providing the displayed webpages/applications. Ad networks often employ tracking mechanisms to determine or identify the types of ads that obtain the highest click-through-rates (CTRs), as well as machine learning algorithms to generate and/or serve the same or similar types of ads in an attempt to obtain similarly high CTRs and thereby generate more revenue.

In many cases, ad networks will serve or publish trick banner ads. Trick banner ads are banner ads that imitate some graphical element users commonly encounter to induce clicks or impressions. Trick banners may imitate operating system messages, messages from popular applications, buttons, forms, and/or other interactive elements. Typically, trick banners employ "bait-and-switch" tactics since trick banners do not usually indicate that they are ads or mention the advertiser in the initial ad. As a result, trick banners commonly obtain higher CTRs than other types of banner ads, despite the fact that most tricked users resent the advertiser for the deceptive behavior. Additionally, advertisers that utilize trick banners may have lower conversion rates than other types of banner ads because the most tricked users did not actually intend to visit the advertiser's web site.

Conventional solutions for removing trick banners and/or other misleading/deceptive advertisements include ad blocking or ad filtering software. Many ad blockers/filters simply block or prevent image loading and autoplaying audio, video, and/or Flash animations. Other ad blockers/filters employ filter rules indicating blacklisted resources to block and/or indicating whitelisted resources to allow rendering and display. These solutions are disadvantageous because they can inadvertently disable features of the rendered and displayed webpages, and in some cases, service providers may purposely disable access to their content and services unless the ad blockers are disabled.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Embodiments described herein are related to providing indications of third party content, services, and/or applications when communicating over a network, such as the Internet. In various embodiments, a user system operates an application that generates a graphical user interface (GUI), which overlays a visual indicator on top of rendered graphical objects based on a source of the resources represented by the graphical objects. The graphical objects (or simply "objects") include, for example, content items (e.g., text, images, video, etc.), links or references to resources, applications, graphical control elements, or any other graphical representation of information or data. The visual indicator indicates whether the source of the resource is provided by a third party platform or service, such as an advertising network ("ad network"). In many cases, graphical objects are designed to imitate interactive elements of the GUI, which may trick users into accessing associated resources by interacting with such graphical objects. These resources are often associated with advertiser content. In embodiments, when the source of a resource is provided by a third party platform or service that is different than the platform or service provider providing a currently displayed webpage, the visual indicator obfuscates a region of the GUI that includes the graphical object that represents that third party resource. The GUI allows a user of the user system to un-obfuscate the visual indicator using a graphical pointer or a desired gesture, depending upon the type of user system. In other words, the embodiments include mechanisms that add indicators directly onto graphical objects sourced from third party platforms or services (also referred to as "lures," "trick content," or the like) that represent content items and/or referenced resources (e.g., websites). These mechanisms add the indicators directly onto the third party graphical objects in a frictionless manner (as compared to existing approaches). Additionally, because the indicators are overlaid on top of the graphical objects, rather than preventing the graphical objects from being loaded and rendered as is the case with ad blockers or filters, the embodiments herein do not inadvertently disable the functionality of the rendered website or application. Other embodiments are described and/or claimed.

Figure 1:
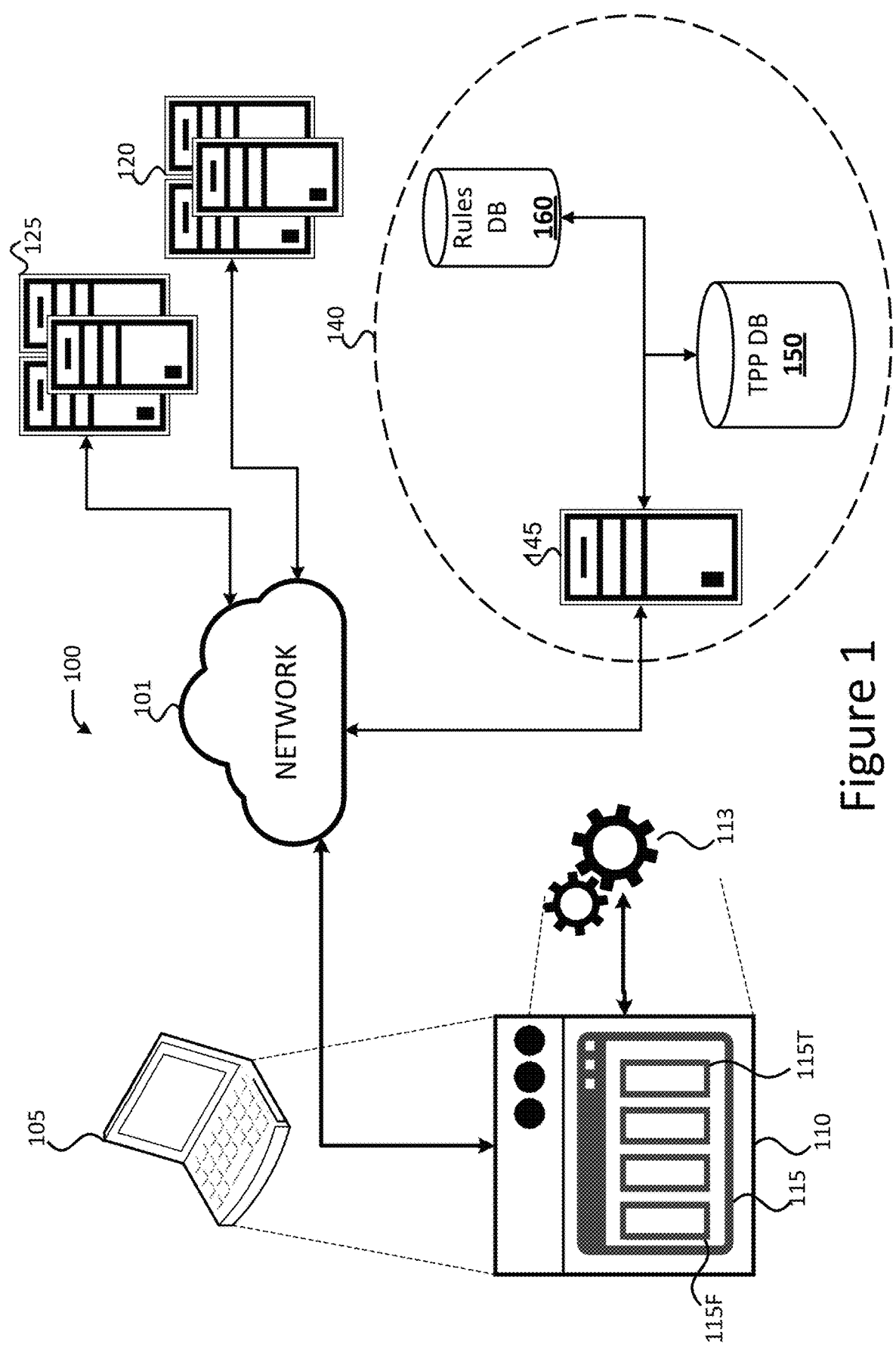
FIG. 1 illustrates an arrangement suitable for practicing various embodiments of the present disclosure.

Referring now to the figures, FIG. 1 shows an arrangement 100 suitable for practicing various embodiments of the present disclosure. As shown in FIG. 1, arrangement 100 includes a client system 105 (also referred to as a "client device", "client system", or the like), network 101, content or service provider platform (SPP) 120, third party platform (TPP) 125, and verification service 140. According to various embodiments, the client system 105 is configured to operate a client application 110 to obtain and render graphical objects 115 (or simply "objects 115") within the client application 110, wherein the client application 110 interacts with the verification service 140 to obfuscate or otherwise indicate objects 115 associated with third party resources such as those provided by TPP 125. Aspects of these embodiments are discussed in more detail infra.

The client system 105 includes physical hardware devices and software components capable of accessing content and/or services provided by the SPP 120 and verification service 140. The client system 105 can be implemented as any suitable computing system or other data processing apparatus usable by users to access content/services provided by the SPP 120 and verification service 140. As examples, the client system 105 can be a desktop computer, a work station, a laptop computer, a mobile cellular phone (e.g., a "smartphone"), a tablet computer, a portable media player, a wearable computing device, or other computing device capable of interfacing directly or indirectly to network 101 or other network. The client system 105 communicates with systems 120 and 140 to obtain content/services using, for example, Hypertext Transfer Protocol (HTTP) over Transmission Control Protocol (TCP)/Internet Protocol (IP), or one or more other common protocols such as Extensible Messaging and Presence Protocol (XMPP); File Transfer Protocol (FTP); Secure Shell (SSH); Session Initiation Protocol (SIP) with Session Description Protocol (SDP), Real-time Transport Protocol (RTP), Secure RTP (SRTP), Real-time Streaming Protocol (RTSP), or the like; Simple Network Management Protocol (SNMP); Web Socket; Wireless Application Messaging Protocol (WAMP); User Datagram Protocol (UDP); QUIC (sometimes referred to as "Quick UDP Internet Connections"); Remote Direct Memory Access (RDMA); Stream Control Transmission Protocol (SCTP); Internet Control Message Protocol (ICMP); Internet Group Management Protocol (IGMP); Internet Protocol Security (IPsec); X.25; and/or the like.

As used herein, the term "content" refers to visual or audible information to be conveyed to a particular audience or end-user, and may include or convey information pertaining to specific subjects or topics. Content or content items may be different content types (e.g., text, image, audio, video, etc.), and/or may have different formats (e.g., text files including Microsoft® Word® documents, Portable Document Format (PDF) documents, HTML documents; audio files such as MPEG-4 audio files and WebM audio and/or video files; etc.). As used herein, the term "service" refers to a particular functionality or a set of functions to be performed on behalf of a requesting party, such as the client system 105. As examples, a service may include or involve the retrieval of specified information or the execution of a set of operations. In order to access the content/services, the client system 105 includes components such as processors, memory devices, communication interfaces, and the like.

The SPP 120 and the TPP 125 include one or more physical and/or virtualized systems for providing content and/or functionality (i.e., services) to one or more clients (e.g., client system 105) over a network (e.g., network 101). The physical and/or virtualized systems include one or more logically or physically connected servers and/or data storage devices distributed locally or across one or more geographic locations. Generally, the SPP 120 is configured to use IP/network resources to provide web pages, forms, applications, data, services, and/or media content to client system 105. As examples, the SPP 120 may provide search engine services, social networking and/or microblogging services, content (media) streaming services, e-commerce services, cloud computing services, cloud analytics services, immersive gaming experiences, and/or other like services. In some embodiments, the SPP 120 may provide on-demand database services, web-based customer relationship management (CRM) services, or the like. In some embodiments, the SPP 120 may also be configured to support communication services such as Voice-over-Internet Protocol (VoIP) sessions, PTT sessions, group communication sessions, and the like for the client system 105 via the network 101.

In order to provide content and/or services to the client system 105, the SPP 120 may operate web servers and/or applications servers. The web server(s) serve static content from a file system of the web server(s), and may generate and serve dynamic content (e.g., server-side programming, database connections, dynamic generation of web documents) using an appropriate plug-in or the like. The application server(s) implement an application platform, which is a framework that provides for the development and execution of server-side applications as part of an application hosting service. The application platform enables the creation, management, and execution of one or more server-side applications developed by the SPP 120 and/or third party application developers, which allow users and/or third party application developers to access the SPP 120 via respective client systems 105. The client system 105 may operate the client application 110 to access the dynamic content, for example, by sending appropriate HTTP messages or the like, and in response, the server-side application(s) may dynamically generate and provide the code, scripts, markup documents, etc., to the client application 110 to render and display objects 115 within the client application 110. A collection of some or all of the objects 115 may be a webpage or application (app) comprising a graphical user interface (GUI) including graphical control elements (GCEs) for accessing and/or interacting with the SPP 120. This collection of objects 115 may be referred to as "webpage 115," "app 115," or the like. The server-side applications may be developed with any suitable server-side programming languages or technologies, such as PHP; Java™ based technologies such as Java Servlets, JavaServer Pages (JSP), JavaServer Faces (JSF), etc.; ASP.NET; Ruby or Ruby on Rails; and/or any other like technology that renders HyperText Markup Language (HTML). The applications may be built using a platform-specific and/or proprietary development tool and/or programming languages.

The webpages/apps 115 served or otherwise provided by the SPP 120 that are accessed by the client system 105 may be referred to as "first party resources 115" or "FPRs 115," and content served by the SPP 120, which may be embedded or otherwise included in the FPRs may be referred to as "first party content" or "FPC." In the example of FIG. 1, objects 115F represent FPC rendered/displayed within the client application 110 and is hereinafter referred to as "FPC 115F." The FPRs 115 may include content and/or services sourced from, and served by a third party entity such as TPP 125. The TPP 125 may serve or otherwise provide content (e.g., text, audio, video, and/or animations) to the client system 105 through webpages or applications provided by the SPP 120. The content served by the TPP 125 via the FPRs 115 may be referred to as "third party content" or "TPC," and the resources linked to, or otherwise referenced by the TPC may be referred to as "third party resources" or "TPRs." In the example of FIG. 1, objects 115T represent TPC rendered/displayed within the client application 110 and is hereinafter referred to as "TPC 115T." TPC 115T and/or TPRs may be hosted by the TPP 125 or some other service provider or platform.

In some cases, some portions or regions of the FPR 115 may be reserved for rendering and displaying the TPC 115T. The regions or portions of FPRs 115 that render and display TPC 115T may be referred to as "TPC slots" or the like. In many cases, the SPP 120 inserts some code or script into their website source documents or application source code, which may include API calls that send requests to the TPP 125 when the FPR 115 is accessed by a client system 105, which then returns the TPC 115T to be rendered/displayed in the FPR 115. The TPP 125 may include one or more application servers that host one or more applications that determine the type of TPC 115T to be provided to the SPP 120, track various user interactions with the TPC, and/or perform other like functions. Usually, the SPP 120 is paid for showing the TPC 115T in their FPRs.

In various embodiments, TPP 125 is an advertising ("ad") network comprising one or more ad servers that serve ad content. An ad server is a type of advertising technology (AdTech) that is used by publishers, advertisers, ad agencies, and ad networks to manage and run online advertising campaigns. Ad servers include mechanisms to determine particular ad content to show on different FPRs 115 (such as those provided by SPP 120), and serve the ad content to end users (e.g., a user of client system 105) via the FPRs 115. The ad servers may include mechanisms to manage serving different ads to different websites/platforms based on various end-user targeting criteria, pacing criteria, and/or other like criteria/parameters. The ad content may include, for example, banner ads, pop-up ads, email ads, video, audio, animations, and/or other like content. The regions or portions of webpages/applications that render and display ads are often referred to as "ad slots" or the like. Additionally, the ad servers also collect and report data pertaining to interactions with the advertising content (e.g., impressions, clicks, cursor/mouse tracking, etc.) for advertisers to gain insights from and monitor the performance of their ads.

As an example, in order to serve TPC 115T (e.g., ads) to an end-user (e.g., client system 105), the SPP 120 (or web server) returns source code documents (e.g., HTML or the like) in response to a request (e.g., an HTTP request) from the client system 105. The client application 110 obtains the source code documents and begins rendering a FPR 115 for display. As the FPR 115 is being rendered, another request is sent to the TPP 125 for TPC 115T to be rendered and displayed within one or more TPC slots within the FPR 115. The TPP 125 selects appropriate TPC 115T to be served to the client system 105 based on information obtained about the client system 105 and/or the user of the client system 105 such as demographic information, system information, user interaction data, and/or the like. Various web tracking mechanisms may be used to obtain this information such as the various web tracking techniques discussed herein. The TPP 125 sends third party source code document(s) to the client system 105. The third party source code document(s) include code, scripts, markup, etc., that is/are inserted into the TPC slot in the FPR 115, and contains URLs, pointers, or other like references to the selected TPC, which is hosted by the TPP 125 or another service or platform (e.g., an advertiser platform where the TPP 125 is an ad network or the like). The third party source code document(s), when rendered/executed by the client application 110, sends a request for the TPC 115T to the TPC 115T host (e.g., the TPP 125 or other service/platform). In response, the TPC 115T host sends the TPC 115T to the client system 105 via the SPP 120, which is then rendered and displayed by the client application 110. The TPP 125 and/or other service/platform may also count an impression or collect other information in response to receipt of the request for the TPC 115T or when the TPC 115T is actually rendered/displayed by the client application 110.

Network 101 comprises computers, network connections among various computers (e.g., between the client system 105, verification service 140, and SPP 120), and software routines to enable communication between the computers over respective network connections. In this regard, the network 101 comprises one or more network elements that may include one or more processors, communications systems (e.g., including network interface controllers, one or more transmitters/receivers connected to one or more antennas, etc.), and computer readable media. Examples of such network elements may include wireless access points (WAPs), a home/business server (with or without radio frequency (RF) communications circuitry), a router, a switch, a hub, a radio beacon, base stations, picocell or small cell base stations, and/or any other like network device. Connection to the network 101 may be via a wired or a wireless connection using the various communication protocols discussed infra. As used herein, a wired or wireless communication protocol may refer to a set of standardized rules or instructions implemented by a communication device/system to communicate with other devices, including instructions for packetizing/depacketizing data, modulating/demodulating signals, implementation of protocols stacks, and the like. More than one network may be involved in a communication session between the illustrated devices. Connection to the network 101 may require that the computers execute software routines which enable, for example, the seven layers of the OSI model of computer networking or equivalent in a wireless (or cellular) phone network. The network 101 may represent the Internet, one or more cellular networks, a local area network (LAN) or a wide area network (WAN) including proprietary and/or enterprise networks, Transfer Control Protocol (TCP)/Internet Protocol (IP)-based network, or combinations thereof. In such embodiments, the network 101 may be associated with network operator who owns or controls equipment and other elements necessary to provide network-related services, such as one or more base stations or access points, one or more servers for routing digital data or telephone calls (e.g., a core network or backbone network), etc. Other networks can be used instead of or in addition to the Internet, such as an intranet, an extranet, a virtual private network (VPN), an enterprise network, a non-TCP/IP based network, any LAN or WAN or the like.

The verification service 140 includes one or more verification servers 145, a TP database (DB) 150 and a rules DB 160. The DBs 150-160 may be stored in one or more data storage devices or storage systems that act as a repository for persistently storing and managing collections of data according to a predefined database structure. The data storage devices/systems may include one or more primary storage devices, secondary storage devices, tertiary storage devices, non-linear storage devices, and/or other like data storage devices. In some implementations, at least some of the verification servers 145 may implement a suitable database management system (DMS) to execute storage and retrieval of information against various database object(s). The DMS may include a relational database management system (RDBMS), an object database management system (ODBMS), a non-relational database management system, and/or the equivalent. The DBs 150-160 can be implemented as part of a single database, a distributed database, a collection of distributed databases, a database with redundant online or offline backups or other redundancies, etc., and can include a distributed database or storage network. The verification server(s) 145 may utilize a suitable query language to store and retrieve information in/from the DBs 150-160, such as Structure Query Language (SQL), object query language (OQL), non-first normal form query language (N1QL), XQuery, and/or the like. Suitable implementations for the database systems and storage devices are known or commercially available, and are readily implemented by persons having ordinary skill in the art.

The TP DB 150 may store data associated with third party (TP) resources, including information pertaining to TPC 115T served by the TPP 125 and other TPPs that points/links to the TPRs. For example, the TP DB 150 may include a record for each TPP and fields, such as those shown by table 1.

TABLE 1

| TP DB field types | Description |
| --- | --- |
| Date Added | Date when a TPR is added to the TP DB |
| Resource Type | Type of resource of the TPR, examples: ad and/or ad type, desktop application, preferred executable format (PEF), web application, mobile app., plug-in, browser extension, bundler, zip file, and document (and format). |
| Status | Indicates whether the TPR is active or inactive |
| TPR Name | Name of the TPR (if any) |
| TP Entity/TPP | Entity or organization providing or publishing the TPR |
| Version | Version number of the TPR (if applicable) |
| Entity Contacted | Indicates whether the TP entity has been notified of the TPR being listed in the TP DB; value may be Boolean or a date of contact |
| Fixed | Indicates whether the deceptive behavior of the TPR has been remediated |
| Violations | Lists deceptive or misleading behaviors of the TPR (if any) (e.g., mimicking graphical elements); reasons for being included in the TP DB |
| TPR Sources | Indicates the address or URL of the TPR including, e.g., methods used to detect the TPR, landing page URI, download URI(s), etc. |
| Deceptive Behavior Metadata | Indicates metadata associated with the TPR, such as portable execution (PE) information, anti-virus (AV) detection information, "malvertising" information, etc. |
| Resource Metadata | Indicates time and/or date of current and previous evaluations of the TPR, first version deemed deceptive, target OS, target user/customer, registered advertising networks, return policy, whether the TPR is monetized, etc. |
| Certification Requirements | Indicates potential requirements for the TPR to be removed from the TP DB and/or become a certified TPR |

TABLE 1-continued

| TP DB field types | Description |
| --- | --- |
| Deceptiveness rank or score | A value indicating the potential deceptiveness of the resource |
| User Tacking Technique(s) | Indicates detected user tracking technique(s) (if any), e.g., cookies, web tokens (e.g., JSON web tokens), URL querying strings, web/browser caching techniques, browser fingerprinting, web beacons of pixel tags, cursor tracking script or plugins, session replay scripts/plugins, IP address tracking, etc. |

The deceptiveness rank or score in table 1 is some value, which may be a number or some other expression, that conveys the misleading, deceptiveness, or maliciousness of a TPR as determined by the verification service 140. The deceptiveness rank/score may be based on the number of rules (which are stored in the rules DB 160) that a given resource violates. For example, a first resource that violates more of these rules than a second resource would have a greater deceptiveness rank/score. Any suitable algorithm may be used to calculate the deceptiveness rank/score, and such algorithms may be chosen based on design choice or empirical analyses.

In addition to data listed by table 1, the TP DB 150 may also store relevant content associated with each TPR. For example, the TP DB 150 may store screenshot images of different aspects of the TPR, such as an image of a TPC 115T pointing to the TPR, a video recording (or screenshot or video frame(s)) of the TPC 115T if the TPC 115T is video or animation content, audio recordings if the TPC 115T includes audio content, captured videos of various interactions with the TPR, screenshots of landing pages of the TPR, or the like.

In some embodiments, the verification service 140 includes a rules DB 160. In various embodiments, the rules DB 160 stores set of constraints and/or standards that are used to identify TPRs and/or TPC 115T, and to separate the TPRs/TPC 115T from the FPRs/FPC 115F for application of the distinction effects to the TPRs/TPC 115T. In some embodiments, the rules DB 160 may optionally store any set of constraints and/or standards for evaluating the deceptiveness of TPC 115T or TPRs. In these embodiments, the rules may be generated based on statutes, regulations, standards, etc. promulgated by governmental agencies or regulatory bodies, standards bodies (e.g., Anti-Malware Testing Standards Organization (AMTSO), W3C Beacon API, etc.). Additionally, the rules DB 160 stores requirements or standards used to determine whether a TPR is misleading or deceptive, such as whether TPC 115T mimics graphical elements of the FPR 115; whether a TPC 115T includes deceptive or misleading information; whether a position or orientation of TPC 115T within a webpage/app 115 is tends to trick users into selecting the TPC 115T; whether a TPR attempts to deceive or mislead users to take any action that was previously declined or cancelled; and/or the like.

As alluded to previously, the client system 105 is configured to run, execute, or otherwise operate client application 110. The client application 110 is a software application designed to generate and render objects 115, which include various types of content such as FPC and TPC. At least some of the objects 115 include GUIs and GCEs that enable interactions with the SPP 120, TPP 125, and/or verification service 140. Additionally, the client application 110 may include one or more components, such as verification component 113, to perform specific functions. The verification component 113 is a software component configured to detect TPRs sourced or served by a third party entity (e.g., the TPP 125 or some other platform/service), and alter the rendered objects 115T to distinguish the TPC 115T from the FPC according to the embodiments discussed herein. In some embodiments, the TPC 115T may be distinguished based on whether the TPC 115T is misleading or deceptive, while in other embodiments the TPC 115T is distinguished regardless of whether the TPC 115T is misleading/deceptive or not. The client application 110 and the verification component 113 may be developed using any suitable programming languages and/or development tools, such as those discussed herein or others known in the art.

In some embodiments, the objects 115 may represent a web application that runs inside the client application 110. For example, the client application 110 may be an HTTP client, such as a "web browser" (or simply a "browser") for sending and receiving HTTP messages to and from a web server of the system 120. In this example, the verification component 113 is a browser extension or plug-in configured to allow the client application 110 to render objects 115 with distinguishing effects (or distinctions) to TPC 115T. Example browsers include WebKit-based browsers, Microsoft's Internet Explorer browser, Microsoft's Edge browser, Apple's Safari, Google's Chrome, Opera's browser, Mozilla's Firefox browser, and/or the like. In another example, the client application 110 may be a desktop or mobile application that runs directly on the client system 105 without a browser, which communicates (sends and receives) suitable messages with the SPP 120. In this example, the verification component 113 is a separate application that communicates with the client application 110 via a suitable API, middleware, software glue, etc., or the verification component 113 is a plug-in configured to allow the client application 110 to render objects 115 with distinguishing effects to TPC 115T.

The client application 110 may be platform-specific, such as when the client system 105 is implemented as a mobile device, such as a smartphone, tablet computer, or the like. In these embodiments, the client application 110 may be a mobile web browser, a native (mobile) application specifically tailored to operate on the mobile client system 105, or a hybrid application wherein objects 115 (or a web application) is embedded inside the native (mobile) application 110. In some implementations, the client application 110 and/or the web applications that run inside the client application 110 is/are specifically designed to interact with server-side applications implemented by the application platform of the provider system (discussed infra). In some implementations, the client application 110, and/or the web applications that run inside the client application 110, may be platform-specific or developed to operate on a particular type of client system 105 or a particular (hardware and/or software) client system 105 configuration. The term "platform-specific" may refer to the platform implemented by the client system 105, the platform implemented by the system 120, and/or a platform of a third party system/platform.

In the aforementioned embodiments, the client system 105 implementing the client application 110 is capable of controlling its communications interface(s) to send and receive HTTP messages to/from the SPP 120 and/or verification service 140, render the aforementioned objects 115 in the client application 110, request connections with other devices, and/or perform (or request performance) of other like functions. The header of these HTTP messages include various operating parameters and the body of the HTTP messages include program code or source code documents (e.g., HTML, XML, JSON, or some other like object(s)/ document(s)) to be executed and rendered in the client application 110. The client application 110 executes the program code or source code documents and renders the objects 115 (or web applications) inside the client application 110.

The rendered objects 115 (or executed web application) allows the user of the client system 105 to view content provided by the SPP 120, which may include the results of a requested service, visual representations of data, hyperlinks or links to other resources, and/or the like. The rendered objects 115 also include interfaces for interacting with the SPP 120, for example, to request additional content or services from the SPP 120. In an example, the rendered objects 115 may include a graphical user interface (GUIs), which are used to manage the interactions between the user of the client system 105 and the SPP 120. The GUIs comprise one or more graphical control elements (GCEs) (or widgets) such as buttons, sliders, text boxes, tabs, dashboards, etc. The user of the client system 105 may select or otherwise interact with one or more of the GCEs (e.g., by pointing and clicking using a mouse, or performing a gesture for touchscreen-based systems) to request content or services from the SPP 120.

In some instances, the rendered and displayed objects 115 may include links to other resources from one or multiple sources, some of which may be TPRs. Some of these TPRs may be misleading, deceptive, or malicious resources, each of which may be in the form of webpages or websites, web apps, executable code, scripts, active content, cloned websites, and/or the like. A "misleading resource" is a resource, application, or service that uses misleading tactics in order to lure users to access or visit those resources. Examples of misleading resources may include a website or platform that use trick banners on other websites/platforms to driver traffic to their website/platform. A "deceptive resource" or "deceptor" is a resource, application, or service that exhibits deceptive behaviors or practices that may potentially harm users or consumers. A malicious resource (or "malware") is a resource that is intentionally designed to cause damage to a computer system or computer network. Examples of deceptors and/or malware may include adware, scareware, spyware, cloned websites, and the like. Some resources may be categorized as any combination of misleading, deceptive, and malicious, and as such, these terms may be used interchangeably throughout the present disclosure. However, most TPRs do not harm users or their devices, but instead attempt to lure or trick users into accessing third party content for advertising purposes or otherwise increase their revenue.

In one example, the SPP 120 is a search engine service, the client application 110 is a browser, and the SPP 120 provides the client system 105 with a search engine results page (SERP) 115 in response to a submitted a search query, where the SERP 115 may include multiple links to other websites and advertising content 115T served by TPP 125. In this example, the ad content 115T in the SERP 115 may reference a respective TPR, which when selected by a user of the client system 105, may lead to the referenced TPR. In another example, the provider service 120 may be a social networking platform, and the client application 110 may be a native (mobile) application 115 that allows a user of the client system 105 to interact with the social networking platform. In this example, the objects 115 rendered by the client application 110 may include direct messages or emails that include links to TPRs, as well as a news feed GUI, timeline GUI, or other like stream of information updates. The news feed or timeline GUI may include user-generated content and/or TPC linking to various TPRs, some of which may be ad content linking to advertiser resources (e.g., "sponsored stories," "sponsored updates," "boosted posts," "promoted tweets," etc.). In any of the aforementioned examples, the the ad content 115T/TPRs may be identified from among the FPRs/FPC 115F, and distinguishing effects may be applied to the ad content 115T/TPRs according to the embodiments discussed infra.

Malicious resources often attempt to lure users into accessing malicious resources, downloading and installing malware onto their client systems 105, automatically execute malicious program code or scripts, display a content item that carriers a malware payload and executes when the user opens or interacts with the content, and/or lure users into submitting their personal or financial information by posing as legitimate platforms. Deceptive resources, on the other hand, often attempt to lure users into accessing deceptive resources, and/or may simply display deceptive content. In these scenarios, it can be difficult for users to discern malicious or deceptive resources from legitimate (trustworthy) resources since malicious and deceptive resources are often designed to look legitimate. For example, some deceptors are designed as anti-virus or anti-malware applications that fail to indicate unfavorable subscription terms and fees. Furthermore, some users inadvertently navigate to misleading and/or deceptive resources based on human error (e.g., accidently clicking on a link to a deceptive resource) and/or based on user interfaces errors (e.g., a poorly calibrated touchscreen).

In order to better detect misleading, deceptive, and/or malicious resources or any TPRs included in FPRs or FPC 115F, the embodiments discussed herein improve upon previous GUIs by dynamically detecting TPRs/TPC 115T in obtained web documents and distinguish the TPRs/TPC from among other displayed content such that the TPRs/TPC 115T become automatically highlighted, accentuated, obscured, concealed, veiled, or otherwise distinguishable from FPC 115F to the user. The TPRs may include links or references to TPRs (e.g., third party websites or TPP 125), or TPC 115T (e.g., text, images, video, etc. that is misleading, deceptive, or malicious) to be rendered within a first party webpage/app or along with FPC 115F in the client application 110. In particular, when the client application 110 obtains a web document, the client application 110 or verification component 113 identifies TPRs in the source code of the web documents, and distinguishes the TPRs 115 from the FPR and/or FPC 115F by altering the behavior of the rendered objects 115T in the client application 110. The behavior of the rendered objects 115T is only altered when a TPR/TPC 115T is detected in the source code so that the TPR/TPC 115T is distinguishable from the user's point of view. In this way, the user of a client system 105 may distinguish between FPC 115F and TPC 115T displayed in a webpage/app 115 so as to not mistakenly access TPRs and/or unintentionally break or disable the webpage/app 115.

Furthermore, the embodiments also provide that the user may remove the distinguishing feature from a TPR/TPC 115T by hovering a cursor over a distinguished region of the GUI or by performing a gesture over the distinguished region. When the user hovers (or performs a desired gesture) over the distinguished area, the TPR is returned to its original form or format so as to be viewable by the user. In this way, the user can easily identify the details of the TPR/TPC 115T within the client application 110 without having to perform additional tasks (e.g., additional clicks or gestures), which reduces computational complexity and overhead. In these ways, instead of blocking access to the TPRs and/or disabling functionality of the webpage/app 115 (which may go against the user's wishes), the client application 110 and/or the verification component 113 injects a visual distinction indicator onto the TPR or TPC 115T.

Moreover, in some embodiments, the verification service 140 may rank the misleading, ambiguous, or deceptive behavior of different resources, and may assign a rank or grade to each resource. In these embodiments, the verification service 140 may provide the rank or a suitable scaling factor, which influences the amount of distinction (e.g., accent, obfuscation, illumination, etc.) to be applied to an individual TPR. In particular, when the client application 110 or verification component 113 identifies TPRs in a web document's source code, and the client application 110 or verification component 113 increases or decreases the distinction applied to the TPRs according to their respective misleading/deceptiveness ranks. In this way, the user can easily judge the misleading nature or deceptiveness of individual objects 115 within the client application 110.

In some embodiments, the elements of arrangement 100 may operate as follows: Some or all of the verification servers 145 in the verification service 140 operate web scrapping algorithms to extract data from various websites, and operate data mining algorithms to identify TPRs from the extracted data. The data mining algorithms may utilize the rules stored in the rules DB 160 in order to determine whether a resource should be considered to be misleading, deceptive, and/or malicious. Once the resources are determined to be misleading, deceptive, and/or malicious, the verification servers 145 may control storage of the resources (or resource IDs) and/or associated data (see e.g., table 1 supra) in the TP DB 150. This process may operate on a periodic basis to identify new TPRs, and the verification servers 145 may re-evaluate the degree to which the previously identified resources are misleading, deceptive, and/or malicious. These processes may be omitted in embodiments that do not identify or rank resource behaviors.

Subsequent or concurrent with (or regardless of) the web scrapping and data mining processes, the client system 105 submits a resource request (e.g., a search query, a webpage URL, etc.) through the client application 110, which is sent in an appropriate message (e.g., an HTTP message). In response, the provider service 120 sends an appropriate response message including source code of the requested resource (e.g., a SERP, a source code documents for a landing page of the requested URL, etc.). Prior to, during, or after the client application 110 executes the source code and renders objects 115, the verification component 113 analyzes the source code for any TPRs in consultation with the verification service 140. For example, where the source code includes HTML, the component 113 may search for hyperlink reference attributes ("href") within respective anchor tags ("<a>") and extract the value of the hyperlink reference attributes.

The consultation with the verification service 140 involves the verification component 113 communicating the identified resources with one or more verification servers 145 in the verification service 140. Continuing with the previous example, the verification component 113 may send the values extracted from the hyperlink reference attributes to the verification server(s) 145. The communication between the verification component 113 and the verification server(s) 145 may be done through the client application 110 or through separate channel. The verification server(s) 145 obtain the identified resources from the client system 105, and query the TP DB 150 using some or all of the parameters passed from the component 113.

If an identified resource matches an entry in the TP DB 150, the verification server(s) 145 responds to the component 113 with a distinction indicator (also referred to as "TPR indicators" or the like). The distinction indicator is a database object or suitable data structure that includes information (e.g., in appropriate data fields or information elements (IEs)) for distinguishing a graphical object 115T associated with a TPR within a GUI. This information includes or indicates the TPR (e.g., using a resource identifier, URL, or the like) and an intensity of the distinction to be applied to the graphical object 115T of the TPR. In some embodiments, the distinction indicator may also indicate a type of distinction to be applied to the graphical object 115T of the TPR, such as highlighting the TPR (with or without a color), shadow effect, contrast, redaction, obfuscation or blurring, illumination, application of a graphic or animation, etc. In these embodiments, the distinction indicator may include or indicate a function to be used for distinguishing the graphical object 115T of the TPR (e.g., a blurring function, redacting function, shadow function, an animation/graphic to apply, and/or some other function such as those discussed herein). In other embodiments, the distinction indicator may indicate or include an index or other identifier that refers to the particular distinction function to be used.

In some embodiments, the distinction indicator may include the previously discussed rank/score to indicate an intensity value for the distinction. In some of these embodiments, the component 113 may use the rank/score to calculate an "distinction factor" (also referred to as a "blur factor"), which indicates an amount of distinction to be applied to the identified resource. In some embodiments, the ranking/score increases as the severity of misleading, deceptive, and/or malicious behavior of the resource increases, which allows the distinction factor to increase (or decrease) in relation to that behavior. In other embodiments, the ranking/scores may be calculated using other criteria/parameters such as based on style or other like design attributes of the rendered webpage/app, user or client system 105 preferences/attributes, or the like. In some embodiments, the distinction factor is a scaling factor, such as a multiplier or percentage, that is used to adjust (i.e., increase or decrease) a default amount of distinction. In other embodiments, the verification server(s) 145 may calculate the distinction factor based on the rank/score, and may send the distinction factor with or in the distinction indicator. In these embodiments, the distinction factor may be an intensity value or percentage.

If an identified resource does not match an entry in the TP DB 150, the verification server(s) 145 may respond to the component 113 with a suitable HTTP status code or may not respond to the component 113 at all. In some embodiments, the verification server(s) 145 may provide a rank/score or scaling factor that indicates that no distinction should be applied. For example, the verification server(s) 145 may send a distinction indicator with a value of zero in a ranking/score field/IE or scaling factor field/IE.

In some embodiments, the component 113, the client application 110, or some other subsystem of the client system 105 may implement a caching mechanism (e.g., a forward position cache system, a client side cache system, or the like) to obtain and store resources and TPR indicators to avoid unnecessary fetching from the SPP 120, TPP 125, and/or the verification service 140 in order to serve existing and/or new user requests more efficiently. In these embodiments, the component 113 and/or the client application 110 may store the TPR indicators in association with cached resources and content. For example, if a back button of the client application 110 is pressed, the local cached version of a previously visited webpage may be displayed instead of a new request being sent to a web server for that webpage. Additionally, any cached TPR indicators stored in association with the webpage may be accessed and applied to objects 115T of that webpage (e.g., as identified by the client app 110 or component 113).

Additionally or alternatively, the verification service 140 may also include or implement a caching mechanism (not shown by FIG. 1) to obtain and store TPR indicators to avoid unnecessary data querying from the TP DB 150 and to serve the distinction indicators to the component 113 more efficiently. This caching mechanism may be implemented by one or more of the verification servers 145 or a separate dedicated caching system, such as a content delivery network (CDN), edge computing system/network, or the like. The caching mechanism may include any suitable system, program code, etc. that, upon receipt, temporarily stores distinction indicators in a local cache. The caching mechanism may include aspects of web caching mechanisms and DB caching mechanisms. A web caching mechanism may temporarily store web objects, and a DB caching mechanism may temporarily store database objects from the DBs 150-155. In some implementations, various components throughout the delivery path to the client system 105 (e.g., intermediate nodes or hops) may also cache distinction indicators to speed up subsequent requests, subject to the caching policies for the resources 315. As an example, the caching mechanism may cache identified resources obtained from component 113 and specific indicators associated with the identified resources according to certain rules, policies, configurations, etc. In cases where the identified resource embeds, references, or otherwise incorporates one or more external resources (e.g., using the source (src) attribute in a script, embed, image (img), audio, and/or video HTML tags; using the relationship (rel) attribute in the anchor (a), link, and/or area HTML tags; using the open( ) method in Ajax or XMLHttpRequest (XHR); using loadStrings, loadJSON, loadXML, loadTable in p5.js of the Processing programming language; using doc.load(xml); and/or the like), the verification server(s) 145 may identify those external resources, and provide TPR indicators of the external resources in a same or similar manner as discussed previously.

In response to receipt of the TPR indicator, the client app 110 or component 113 distinguished a visual representation of the identified resource during or after the objects 115 are rendered in the client application 110. When the TPR indicator includes an distinction factor, the component 113 adjusts the amount of distinction to be applied to the visual representation of the identified resource. Example user interfaces in accordance with these embodiments are shown and described with regard to FIGS. 2-3.

Figure 2:
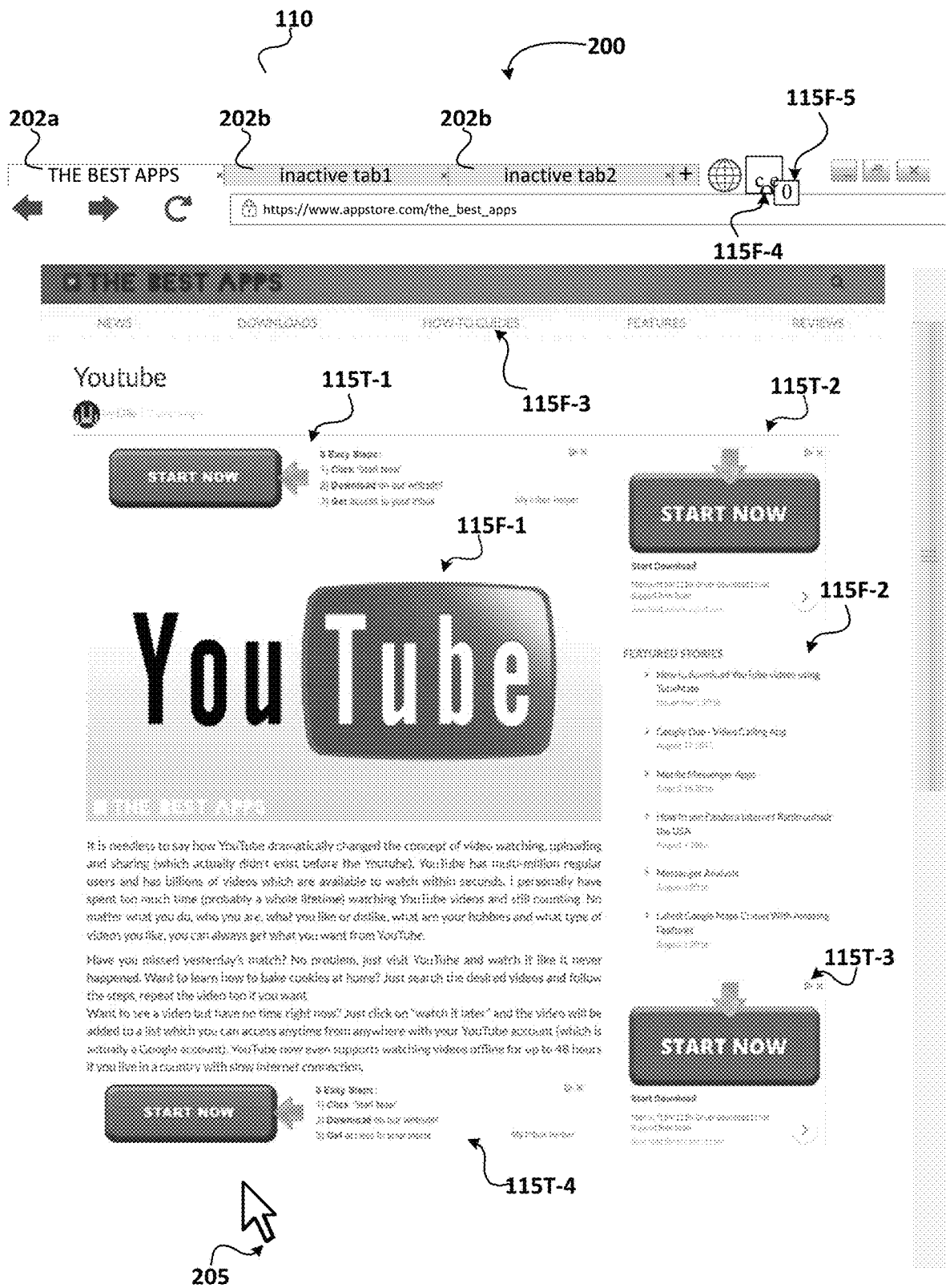
FIGS. 2-3 illustrate example interfaces for generating graphical user interfaces with obfuscated third party resources, in accordance with various embodiments.
Figure 3:
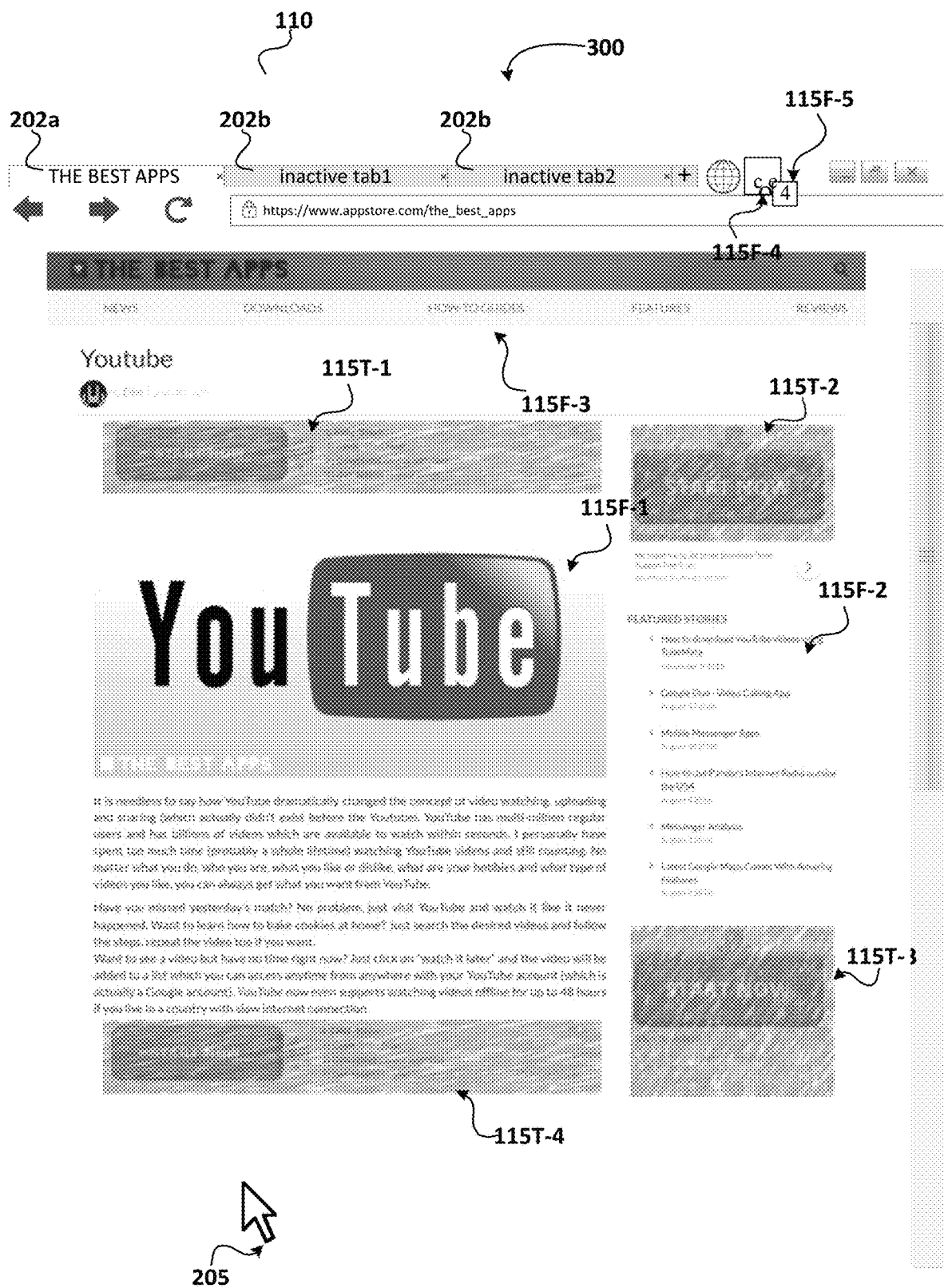

Referring now to FIGS. 2-3, which illustrate example interfaces facilitated by a remote system (e.g., SPP 120, TPP 125, and verification service 140 of FIG. 1) according to various techniques described herein. In particular, each of FIGS. 2-3 illustrate example interfaces that may be displayed on a client system 105 (such as the various GUIs and GCEs discussed previously). The example interfaces of FIGS. 2-3 may be displayed or rendered by the client application 110 and altered by the component 113. While particular example interfaces are illustrated, in various embodiments, other interfaces may be utilized. FIGS. 2-3 illustrate an example user interface where the distinguishing effect includes obfuscating (or blurring) various TPCs 115T, in accordance with various example embodiments. Although the example of FIGS. 2-3 describe the use of obfuscation or blurring to distinguish TPRs from FPRs, in other embodiments, other types of distinguishing effects may be used in a same or similar manner as discussed infra.

In the example illustrated by FIGS. 2-3, the client application 110 is a browser displaying GUI instance 200 and GUI instance 300. GUI instance 200 and 300 include, inter alia, active tab 202a, inactive tabs 202b, and rendered objects 115F (including 115F-1 to 115F-5) and 115T (including 115T-1 to 115T-4). The rendered objects 115a-g include search result objects 115a-d, text box 115e, icon 115F-4, and badge 115F-5. In the example of FIGS. 2-3, the GUI instance 200 comprises a webpage ("THE BEST APPS" in FIGS. 2-3) returned from the SPP 120. The icon 115F-4 in this example is a browser action icon that acts as a button in the browser toolbar. Selecting the icon 115F-4, for example by using pointer 205 to point and click on the icon 115F-4, may cause a pop-up to appear and display content (not shown by FIGS. 2-3). The badge 115F-5 is text that is layered over the icon 115F-4. The badge 115F-5 may display text based on the actions of the component 113. In embodiments, the badge 115F-5 displays a number of objects 115T that have been detected and distinguished, which is "0" in the example of FIG. 2 because the identified objects 115T have not been distinguished yet. By contrast, the badge number is "4" in the example of FIG. 3 because four identified objects 115T have been overlaid with a distinction effect (e.g., a blurring effect).

In the example of FIGS. 2-3, the objects 115T have been identified as TPC served by or sourced from a third party entity (e.g., TPP 125 of FIG. 1). Each of TPC 115T is a visual representation of a corresponding TRP. For example, TPC 115T-1 and TPC 115T-3 are each a visual representation of the TRP "My Inbox Helper," and TPC 115T-2 and TPC 115T-4 are each a visual representation of the resource "Microsoft 64/36 Bit Driver Download Driver." The GUI instance 300 shows the TPCs 115T being obfuscated with a blurring effect. Any suitable blurring effect may be used, such as Gaussian blurring, box blurring, Bokeh blurring, or some other blurring effect. In other embodiments, some other obfuscation technique may be used, such as by using an opacity filter (e.g., "opacity(<number-percentage>)" in CSS with a<number-percentage> value under 20%), using a brightness function with a relatively low brightness value (e.g., using the "brightness(<number-percentage>)" in CSS with a<number-percentage> value under 100%), redacting the deceptor 115d or the like.

The blurring effect may be influenced by TPR ranking indicated by a distinction indicator as mentioned previously. For example, where a Gaussian blur effect is used, each pixel making up or surrounding the TPCs 115T is weighted based on their distance to a center pixel such that pixels that are closer to the center pixel will have a greater weight, and more distant pixels will have a lower weight. In this example, the ranking or distinction indicator may indicate an average weight to be applied to the pixels making up and/or surrounding the TPCs 115T, or an extent to which the blurring increases or decreases between the center of visual representation of the TPCs 115T and its edges. In this way, the TPR ranking or distinction indicator may cause the app 110 or component 113 to produce the blur effect with a specific factor or with a specific intensity distribution or profile.

FIG. 3 shows an example where the same obfuscation intensity is used for each TPC 115T. However, it should be noted that each TPC 115T may be obfuscated using a different percentages and/or blur factor values than other TPCs 115T. The percentage blur factor values in the aforementioned examples may refer to an intensity of the obfuscation, and may be based on the particular implementation used. For example, the CSS blur( ) function takes an input of a number of pixels or a radius length (e.g., "filter: blur(<length>)"), and in these embodiments, the blur factor may be based on a percentage of the number of pixels to be blurred or a percentage of a maximum radius of a perimeter around the TPCs 115T.

Although not shown by FIGS. 2-3, the pointer 205 may be moved and/or hovered over a TPC 115T. In response to the pointer 205 being hovered over a TPC 115T, the app 110 or component 113 generates or alters the GUI instance 300 to unobfuscate the TPC 115T, which may unobfuscate or otherwise reveal the TPC 115T as shown by FIG. 2. In embodiments where a touchscreen interface is used, a desired gesture may be defined for removing the obfuscation, such as a tap and hold gesture, a double tap gesture, or the like. In some mobile device implementations, the obfuscated region in the GUI may take up a majority of the screen to increase the likelihood that the user touches the obfuscated region automatically while scrolling through the GUI.

In embodiments, removal of the obfuscation may be done using a suitable optical effect, such as having the obfuscation fade out or fade away, or using some sort of animation to reveal the TPC 115T over some period of time. In other embodiments, the TPC 115T may be partially revealed in response to the pointer 205 being hovered over the deceptor 115. Additionally, the app 110 or component 113 may return the obfuscation to the TPC 115T (e.g., by generating the GUI instance 300) when the user moves the pointer 205 away from the TPC 115T or performs some gesture where gestures are used. In some embodiment, the app 110 or component 113 may use an optical effect, such as a fade-in or an animation, when (re)generating the obfuscation. Additionally, a suitable delay may be applied to removal or (re)generation of the obfuscation, which may aid in the identification and/or readability of the TPC 115T. In some embodiments, the obfuscation may be added or removed from portions of the TPC 115T as the user moves the pointer 205 across the TPC 115T (or performs a slide, drag, or swipe gesture), similar to an image reveal slider or the like. In the aforementioned embodiments, the TPC 115T itself is obfuscated, which is more effective than adding an icon in the address box of the browser, adding an icon next to the TPR itself, or attempting to block or disable the TPCs 115T. Allowing the obfuscation to be removed (or fade away) when the user hovers the pointer 205 over the TPC 115T is advantageous because it does not require the user to perform any additional clicks (or gestures for touchscreen interfaces) to expose the TPR 115d. In this way, the automatic generation or removal of the obfuscation based on the pointer 205 movement provides the user with a frictionless experience and with no additional computational overhead for creating/rendering additional GUI instances.

Figure 4:
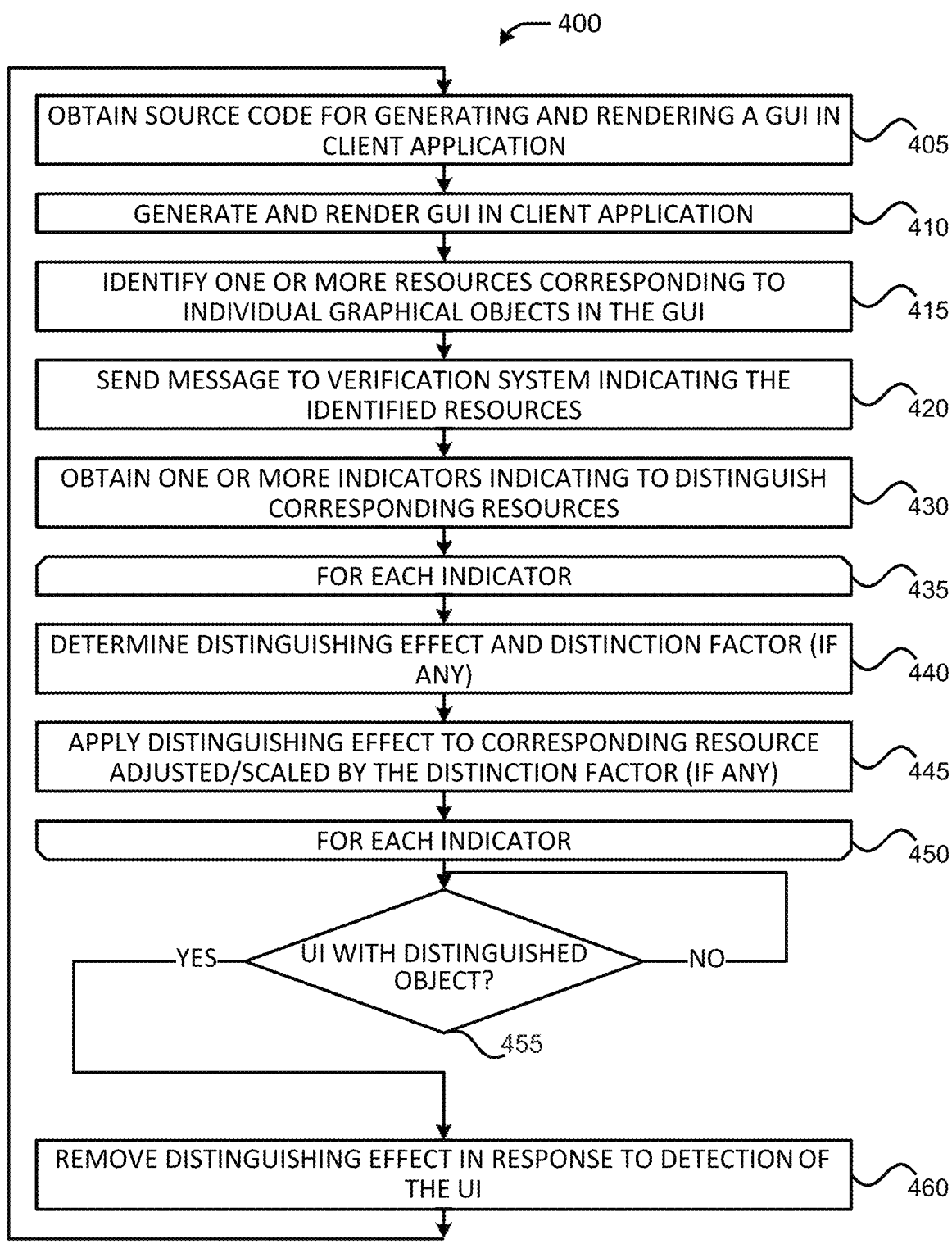
FIG. 4 illustrates an example process for generating an rendering user interfaces in accordance with various embodiments.
Figure 5:
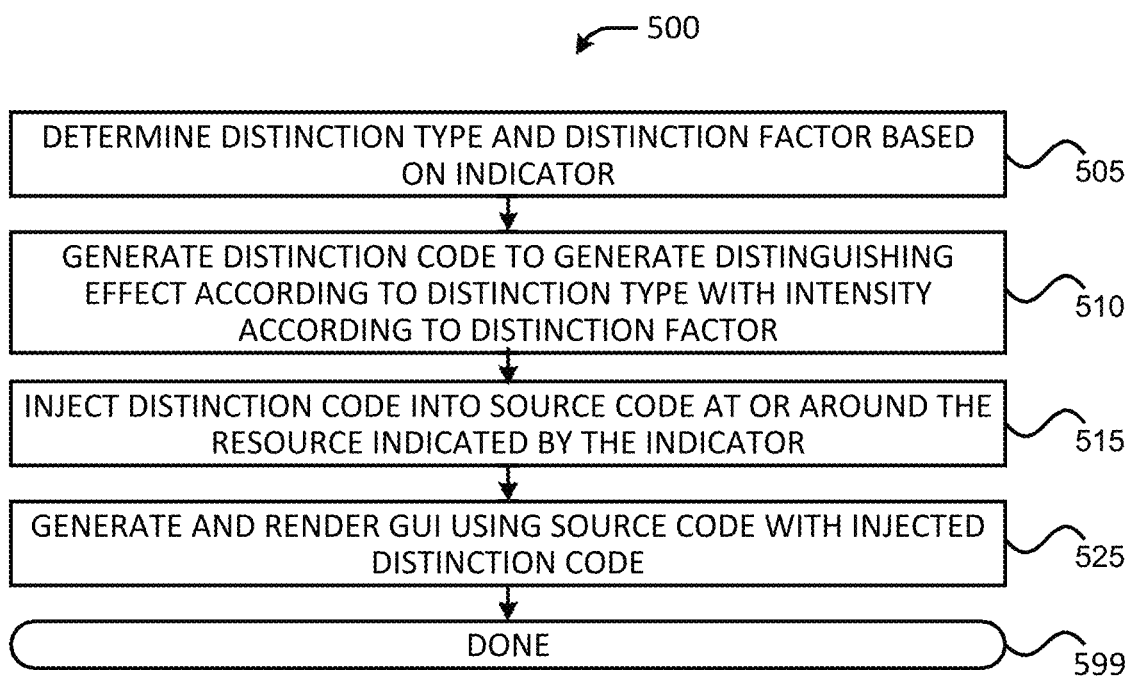
FIG. 5 illustrates an example process for applying distinguishing effects to a third party resource in accordance with various embodiments.

FIGS. 4-5 illustrate example processes 400 and 500A-500B, respectively, in accordance with various embodiments. For illustrative purposes, the operations of each of processes 400 and 500A-500B are described as being performed by the client application 110 and the component 113 operated by the client system 105 discussed previously with respect to FIG. 1. In embodiments, a processor system of the client system 105 (e.g., processor circuitry 602 shown by FIG. 6) executes program code of the client application 110 and program code of the component 113 to perform the operations of processes 400, 500A, and 500B. Additionally, a communication system of the client system 105 (e.g., communication circuitry 609 of FIG. 6) is used to communicate (transmit/receive) messages with the SPP 120, TPP 125, and/or verification service 140. While particular examples and orders of operations are illustrated in FIGS. 4-5, in various embodiments, these operations may be re-ordered, broken into additional operations, combined, and/or omitted altogether. Furthermore, in some embodiments the operations illustrated in FIG. 4-5 may be combined with operations described with regard to other example embodiments and/or one or more operations described with regard to the non-limiting examples provided herein.

Referring now to FIG. 4, an example process 400 for generating and rendering a GUI according to various embodiments, is shown. Process 400 begins at operation 405, where the client application 110 obtains source code for generating a GUI in the client application 110. At operation 410, the client application 110 generates and renders the GUI in the client application 110. At operation 415, the component 113 identifies one or more resources corresponding to individual graphical objects 115 in the GUI.

At operation 420, the component 113 generates a message to indicate the identified resources, and sends the message to the verification service 140. The message may be any suitable message, such as those discussed herein. At operation 425, the component 113 obtains one or more distinction/TPR indicators from the verification service 140, which indicate corresponding resources to be distinguished. The one or more indicators may be contained in a suitable message, such as those discussed herein.

At open loop operation 435, the component 113 processes each of the one or more indicators, in turn. At operation 440, the component determines an indicator type of the indicator, or determines a distinguishing effect and distinction factor (if any) indicated by the indicator. For example, as mentioned previously, the indicator may include a distinction function (e.g., blur function, illumination function, graphics or animation, etc.) or may include an index or value that corresponds with the desired distinguishing effect. At operation 445, the component 113 applies the distinguishing effect to a corresponding graphical object 115 associated with TRP indicated by the indicator. Process 500A of FIG. 5 is an example process for applying a distinguishing effect to a TRP, which is discussed in more detail infra. At operation 450, the component 113 proceeds back to operation 435 to process a next indicator, if any.

Meanwhile, at operation 455, the component 113 determines whether a user interaction (UI) has been detected with an distinguished object 115. In one example, the component 113 may detect a UI by executing the HTML/CSS functions hover( ) or mouseover( ) when the client system 105 includes a mouse input device. In another example, the component 113 may detect a UI through the TouchEvent interface (or executing TouchEvent( ) function to create TouchEvent objects) when the client system includes a touch interface (e.g., a touchscreen or touchpad). In this example, the UI could be detected by measuring a time between a "touchstart" event and a "touchend" event. Other methods for detecting UIs with the obfuscated and illuminated objects 115 may be used in other embodiments. If at operation 455, the component 113 does not detect a UI with an distinguished object 115, then the component 113 loops back to continue to monitor for UIs with the distinguished objects 115. If at operation 455, the component 113 does detect a UI with an distinguished object 115, then the component 113 proceeds to operation 460 to remove the distinguishing effect in response to the detection of the UI. After performance of operation 460, the process may end or repeat as necessary.

Referring now to FIG. 5, an example process 500 for distinguishing TPRs according to various embodiments, is shown. In embodiments, process 500 may correspond to operation 440 and/or 445 of process 400 shown and described with respect to FIG. 4. Additionally, process 500 may encompass aspects of operations 455-460 of process 400.

Process 500 begins at operation 505 where the component 113 determines a distinction type (or distinguishing effect) and distinction factor included in a received distinction indicator. The distinction indicator may also identify the TPR using a URL or resource identifier. At operation 510A, the component 113 generates distinction code based on the distinction type and distinction factor. The distinction code is used to distinguish the graphical object 115 that corresponds to the TPR according to the distinction type and with an intensity according to the distinction factor. The intensity may be a "distinction intensity value" or the like. In embodiments, the distinction code may also include code for removing the distinction from the graphical object 115 of the TPR in response to a defined UI with the graphical object 115.

At operation 515, the component 113 injects the distinction code into source code used for generating the GUI in or around the TPR. For example, where the GUI is a SERP and the TPR is a search result in the SERP, the component 113 may search for a link or reference to the TPR in the source code of the SERP using a URL in the distinction indicator, such as by analyzing the source code for hyperlink reference attributes ("href") within respective anchor tags ("<a>"). Once found, the component 113 may insert the distinction code before and/or after the link or reference to the TPR, such by inserting appropriate division or section tags ("<div>") or span tags ("<span>") around the anchor tags including hyperlink references to the TPR. The division, section or span tags may include attributes or identifiers used to indicate where the distinction should be applied. In another example, the component 113 may execute the distinction code to alter the anchor tags themselves such that the anchor tags including a hyperlink reference to the TPR are obfuscated when the GUI is rendered. Additionally, the distinction code may include instructions for removing the distinction upon detection of a desired UI with the graphical object 115 of the TPR. These instructions may correspond to operations 455-460 of process 400. At operation 525, the client application 110 generates and renders the GUI using source code injected with the distinction code. After completion of operation 525, the component 113 may proceed to operation 599 to return back to perform process 400 or end.

Figure 6:
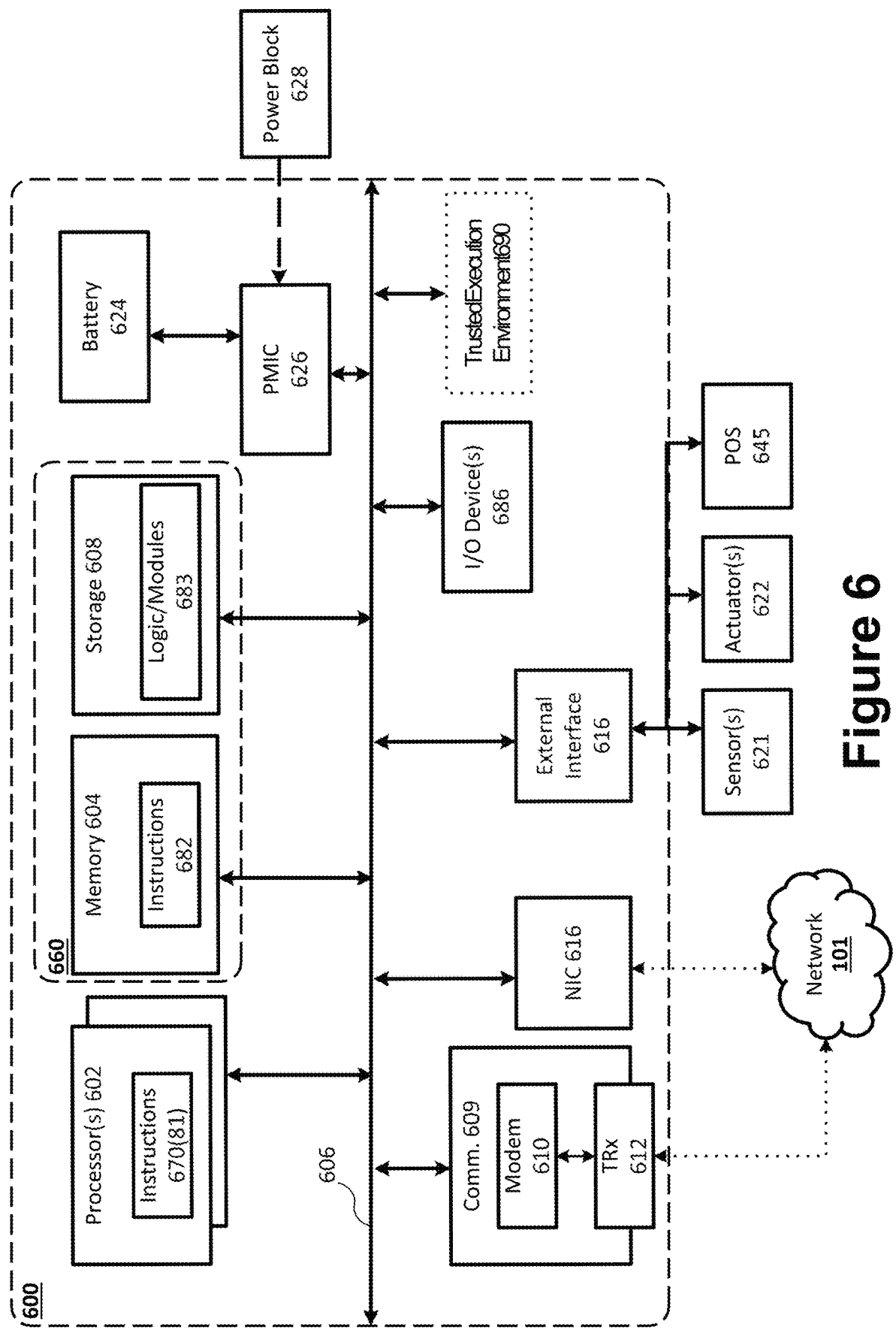
FIG. 6 illustrates an example computing system suitable for practicing various aspects of the present disclosure in accordance with various embodiments.

FIG. 6 illustrates an example of an computing system 600 (also referred to as "platform 600," "device 600," "appliance 600," or the like) in accordance with various embodiments. The system 600 may be suitable for use as any of the computer devices discussed herein, such as client system 105, a server of the SPP 120, or a verification server 145. The components of system 600 may be implemented as an individual computer system, or as components otherwise incorporated within a chassis of a larger system. The components of system 600 may be implemented as integrated circuits (ICs) or other discrete electronic devices, with the appropriate logic, software, firmware, or a combination thereof, adapted in the computer system 600. Additionally or alternatively, some of the components of system 600 may be combined and implemented as a suitable System-on-Chip (SoC), System-in-Package (SiP), multi-chip package (MCP), or the like.

The system 600 includes processor circuitry 602, which is configured to execute program code, and/or sequentially and automatically carry out a sequence of arithmetic or logical operations; record, store, and/or transfer digital data. The processor circuitry 602 includes circuitry such as, but not limited to one or more processor cores and one or more of cache memory, low drop-out voltage regulators (LDOs), interrupt controllers, serial interfaces such as serial peripheral interface (SPI), inter-integrated circuit (I²C) or universal programmable serial interface circuit, real time clock (RTC), timer-counters including interval and watchdog timers, general purpose input-output (I/O), memory card controllers, interconnect (IX) controllers and/or interfaces, universal serial bus (USB) interfaces, mobile industry processor interface (MIPI) interfaces, Joint Test Access Group (JTAG) test access ports, and the like. The processor circuitry 602 may include on-chip memory circuitry or cache memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of processor circuitry 602 may include, for example, one or more processor cores (CPUs), one or more graphics processing units (GPUs), one or more reduced instruction set computing (RISC) processors, one or more Acorn RISC Machine (ARM) processors, one or more complex instruction set computing (CISC) processors, one or more DSPs, one or more programmable logic devices (PLDs), one or more FPGAs, ASICs one or more microprocessors or controllers, or any suitable combination thereof. Individual processors (or individual processor cores) of the processor circuitry 602 may be coupled with or may include memory/storage and may be configured to execute instructions stored in the memory/storage to enable various applications or operating systems to run on the system 600. In these embodiments, the processors (or cores) of the processor circuitry 602 are configured to operate application software (e.g., client application 110, component 113, one or more server-side applications, ad server applications, verification service 140 applications, etc.) to provide specific services to a user of the system 600. In some embodiments, the processor circuitry 602 may include special-purpose processor/controller to operate according to the various embodiments herein.

As examples, the processor circuitry 602 may include Intel® Core™ based processor(s), MCU-class processor(s), Pentium® processor(s), Xeon® processor(s); Advanced Micro Devices (AMD) Zen® Architecture processor(s) such as Ryzen® or Epyc® processor(s), or other AMD processors such as Accelerated Processing Units (APUs), MxGPUs, or the like; A5-12 and/or S1-S4 processor(s) from Apple® Inc.; Snapdragon™ or Centriq™ processor(s) from Qualcomm® Technologies, Inc., Texas Instruments, Inc.® Open Multimedia Applications Platform (OMAP)™ processor(s); MIPS Warrior M-class, Warrior I-class, and Warrior P-class processor(s) provided by MIPS Technologies, Inc.; ARM Cortex-A, Cortex-R, and Cortex-M family of processor(s) as licensed from ARM Holdings, Ltd.; the ThunderX2® provided by Cavium™, Inc.; or the like. Other examples of the processor circuitry 602 may be mentioned elsewhere in the present disclosure.

In some implementations, such as when system 600 is (or is part of) a server computer system, the processor circuitry 602 may include one or more hardware accelerators. The hardware accelerators may be microprocessors, configurable hardware (e.g., field-programmable gate arrays (FPGAs), programmable Application Specific Integrated Circuits (ASICs), programmable SoCs, digital signal processors (DSP), etc.), or some other suitable special-purpose processing device tailored to perform one or more specific tasks. The hardware accelerators may be hardware devices that perform various functions that may be offloaded from an one or more processors of the processor circuitry 602. In these embodiments, the circuitry of processor circuitry 602 may comprise logic blocks or logic fabric including and other interconnected resources that may be programmed to perform various functions, such as the procedures, methods, functions, etc. of the various embodiments discussed herein. Additionally, the processor circuitry 602 may include memory cells (e.g., EPROM, EEPROM, flash memory, static memory (e.g., SRAM, anti-fuses, etc.) used to store logic blocks, logic fabric, data, etc. in LUTs and the like. In embodiments where subsystems of the computing system 600 are implemented as individual software agents or AI agents, each agent may be implemented in a respective hardware accelerator that are configured with appropriate bit stream(s) or logic blocks to perform their respective functions In some implementations, processor(s) and/or hardware accelerators of the application circuitry 602 may be specifically tailored for operating the software (AI) agents and/or for machine learning functionality, such as a cluster of AI GPUs, tensor processing units (TPUs) developed by Google® Inc., a Real AI Processors (RAPs™) provided by AlphalCs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the hardware accelerator may be implemented as an AI accelerating co-processor, such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit within the HiSilicon Kirin 970 provided by Huawei®, and/or the like.

The system memory circuitry 604 comprises any number of memory devices arranged to provide primary storage from which the processor circuitry 602 continuously reads instructions 682 stored therein for execution. In some embodiments, the memory circuitry 604 is on-die memory or registers associated with the processor circuitry 602. As examples, the memory circuitry 604 may include volatile memory such as random access memory (RAM), dynamic RAM (DRAM), synchronous DRAM (SDRAM), etc. The memory circuitry 604 may also include nonvolatile memory (NVM) such as high-speed electrically erasable memory (commonly referred to as "flash memory"), phase change RAM (PRAM), resistive memory such as magnetoresistive random access memory (MRAM), etc. The memory circuitry 604 may also comprise persistent storage devices, which may be temporal and/or persistent storage of any type, including, but not limited to, non-volatile memory, optical, magnetic, and/or solid state mass storage, and so forth.

Storage circuitry 608 is arranged to provide persistent storage of information such as data, applications, operating systems (OS), and so forth. As examples, the storage circuitry 608 may be implemented as hard disk drive (HDD), a micro HDD, a solid-state disk drive (SSDD), flash memory cards (e.g., SD cards, microSD cards, xD picture cards, and the like), USB flash drives, on-die memory or registers associated with the processor circuitry 602, resistance change memories, phase change memories, holographic memories, or chemical memories, and the like. In some implementations, the storage circuitry 608 and/or memory circuitry 604 may be disposed in or on a same die or package as the processor circuitry 602 (e.g., a same SoC, a same SiP, or soldered on a same MCP as the processor circuitry 602).

The storage circuitry 608 is configured to store computational logic 683 (or "modules 683") in the form of software, firmware, microcode, or hardware-level instructions to implement the techniques described herein. The computational logic 683 may be employed to store working copies and/or permanent copies of programming instructions for the operation of various components of system 600 (e.g., drivers, libraries, application programming interfaces (APIs), etc.), an OS of system 600, one or more applications, and/or for carrying out the embodiments discussed herein (such as one or more operations of processes 400-500 of FIGS. 4-5). The computational logic 683 may be stored or loaded into memory circuitry 604 as instructions 682, which are then accessed for execution by the processor circuitry 602 to carry out the functions described herein. The various elements may be implemented by assembler instructions supported by processor circuitry 602 or high-level languages that may be compiled into instructions 681 to be executed by the processor circuitry 602. The permanent copy of the programming instructions may be placed into persistent storage devices of storage circuitry 608 in the factory or in the field through, for example, a distribution medium (not shown), through a communication interface (e.g., from a distribution server (not shown)), or over-the-air (OTA).

In an example, the instructions 682 provided via the memory circuitry 604 and/or the storage circuitry 608 of FIG. 6 are embodied as one or more non-transitory computer readable storage media (see e.g., NTCRSM 660) including program code, a computer program product or data to create the computer program, with the computer program or data, to direct the processor circuitry 602 of platform 600 to perform electronic operations in the platform 600, and/or to perform a specific sequence or flow of actions, for example, as described with respect to the flowchart(s) and block diagram(s) of operations and functionality depicted previously. The processor circuitry 602 accesses the one or more non-transitory computer readable storage media over the interconnect 606.

In alternate embodiments, programming instructions (or data to create the instructions) may be disposed on multiple NTCRSM 660. In alternate embodiments, programming instructions (or data to create the instructions) may be disposed on computer-readable transitory storage media, such as, signals. The instructions embodied by a machine-readable medium may further be transmitted or received over a communications network using a transmission medium via a network interface device utilizing any one of a number of transfer protocols (e.g., HTTP). Any combination of one or more computer usable or computer readable medium(s) may be utilized. The computer-usable or computer-readable medium may be, for example but not limited to, one or more electronic, magnetic, optical, electromagnetic, infrared, or semiconductor systems, apparatuses, devices, or propagation media. For instance, the NTCRSM 660 may be embodied by devices described for the storage circuitry 608 and/or memory circuitry 604. More specific examples (a non-exhaustive list) of a computer-readable medium would include the following: an electrical connection having one or more wires, a portable computer diskette, a hard disk, a random access memory (RAM), a read-only memory (ROM), an erasable programmable read-only memory (EPROM, Flash memory, etc.), an optical fiber, a portable compact disc read-only memory (CD-ROM), an optical storage device and/or optical disks, a transmission media such as those supporting the Internet or an intranet, a magnetic storage device, or any number of other hardware devices. Note that the computer-usable or computer-readable medium could even be paper or another suitable medium upon which the program (or data to create the program) is printed, as the program (or data to create the program) can be electronically captured, via, for instance, optical scanning of the paper or other medium, then compiled, interpreted, or otherwise processed in a suitable manner, if necessary, and then stored in a computer memory (with or without having been staged in or more intermediate storage media). In the context of this document, a computer-usable or computer-readable medium may be any medium that can contain, store, communicate, propagate, or transport the program (or data to create the program) for use by or in connection with the instruction execution system, apparatus, or device. The computer-usable medium may include a propagated data signal with the computer-usable program code (or data to create the program code) embodied therewith, either in baseband or as part of a carrier wave. The computer usable program code (or data to create the program) may be transmitted using any appropriate medium, including but not limited to wireless, wireline, optical fiber cable, RF, etc.

In various embodiments, the program code (or data to create the program code) described herein may be stored in one or more of a compressed format, an encrypted format, a fragmented format, a packaged format, etc. Program code (or data to create the program code) as described herein may require one or more of installation, modification, adaptation, updating, combining, supplementing, configuring, decryption, decompression, unpacking, distribution, reassignment, etc. in order to make them directly readable and/or executable by a computing device and/or other machine. For example, the program code (or data to create the program code) may be stored in multiple parts, which are individually compressed, encrypted, and stored on separate computing devices, wherein the parts when decrypted, decompressed, and combined form a set of executable instructions that implement the program code (the data to create the program code such as that described herein. In another example, the Program code (or data to create the program code) may be stored in a state in which they may be read by a computer, but require addition of a library (e.g., a dynamic link library), a software development kit (SDK), an application programming interface (API), etc. in order to execute the instructions on a particular computing device or other device. In another example, the program code (or data to create the program code) may need to be configured (e.g., settings stored, data input, network addresses recorded, etc.) before the program code (or data to create the program code) can be executed/used in whole or in part. In this example, the program code (or data to create the program code) may be unpacked, configured for proper execution, and stored in a first location with the configuration instructions located in a second location distinct from the first location. The configuration instructions can be initiated by an action, trigger, or instruction that is not co-located in storage or execution location with the instructions enabling the disclosed techniques. Accordingly, the disclosed program code (or data to create the program code) are intended to encompass such machine readable instructions and/or program(s) (or data to create such machine readable instruction and/or programs) regardless of the particular format or state of the machine readable instructions and/or program(s) when stored or otherwise at rest or in transit.

Computer program code for carrying out operations of the present disclosure (e.g., computational logic 683, instructions 682, 681 discussed previously) may be written in any combination of one or more programming languages such as, for example, Python, PyTorch, NumPy, Ruby, Ruby on Rails, Scala, Smalltalk, Java™, C++, C#, "C", Rust, Go (or "Golang"), JavaScript, Server-Side JavaScript (SSJS), PHP, Pearl, Lua, Torch/Lua with Just-In Time compiler (LuaJIT), Accelerated Mobile Pages Script (AMPscript), VBScript, JavaServer Pages (JSP), Active Server Pages (ASP), Node.js, ASP.NET, JAMscript, Hypertext Markup Language (HTML), XML, EXI, XSL, XSD, wiki markup or Wikitext, Wireless Markup Language (WML), JSON, Apache® MessagePack™, Cascading Stylesheets (CSS), Mustache template language, Handlebars template language, Guide Template Language (GTL), Apache® Thrift, ASN.1, protobuf, Android® Studio™ integrated development environment (IDE), Apple® iOS® software development kit (SDK), and/or any other programming language or development tools including proprietary programming languages and/or development tools. The computer program code for carrying out operations of the present disclosure may also be written in any combination of the programming languages discussed herein. The program code may execute entirely on the system 600, partly on the system 600, as a stand-alone software package, partly on the system 600 and partly on a remote computer or entirely on the remote computer or server. In the latter scenario, the remote computer may be connected to the system 600 through any type of network, including a LAN or WAN, or the connection may be made to an external computer (e.g., through the Internet using an Internet Service Provider).

In an example, the instructions 670 on the processor circuitry 602 (separately, or in combination with the instructions 682 and/or logic/modules 683 stored in computer-readable storage media) may configure execution or operation of a trusted execution environment (TEE) 690. The TEE 690 operates as a protected area accessible to the processor circuitry 602 to enable secure access to data and secure execution of instructions. In some embodiments, the TEE 690 may be a physical hardware device that is separate from other components of the system 600 such as a secure-embedded controller, a dedicated SoC, or a tamper-resistant chipset or microcontroller with embedded processing devices and memory devices. Examples of such embodiments include a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, Apple® Secure Enclave coprocessor; IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like.

In other embodiments, the TEE 690 may be implemented as secure enclaves, which are isolated regions of code and/or data within the processor and/or memory/storage circuitry of the system 600. Only code executed within a secure enclave may access data within the same secure enclave, and the secure enclave may only be accessible using the secure application (which may be implemented by an application processor or a tamper-resistant microcontroller). Various implementations of the TEE 690, and an accompanying secure area in the processor circuitry 602 or the memory circuitry 604 and/or storage circuitry 608 may be provided, for instance, through use of Intel® Software Guard Extensions (SGX), ARM® TrustZone® hardware security extensions, Keystone Enclaves provided by Oasis Labs™, and/or the like. Other aspects of security hardening, hardware roots-of-trust, and trusted or protected operations may be implemented in the device 600 through the TEE 690 and the processor circuitry 602.

Although the instructions 682 are shown as code blocks included in the memory circuitry 604 and the computational logic 683 is shown as code blocks in the storage circuitry 608, it should be understood that any of the code blocks may be replaced with hardwired circuits, for example, built into an FPGA, ASIC, or some other suitable circuitry. For example, where processor circuitry 602 includes (e.g., FPGA based) hardware accelerators as well as processor cores, the hardware accelerators (e.g., the FPGA cells) may be pre-configured (e.g., with appropriate bit streams) with the aforementioned computational logic to perform some or all of the functions discussed previously (in lieu of employment of programming instructions to be executed by the processor core(s)).

The operating system (OS) of system 600 may be a general purpose OS or an OS specifically written for and tailored to the computing system 600. For example, when the system 600 is a server system or a desktop or laptop systems 105-135, the OS may be Unix or a Unix-like OS such as Linux e.g., provided by Red Hat Enterprise, Windows 10™ provided by Microsoft Corp.®, macOS provided by Apple Inc.®, or the like. In another example where the system 600 is a mobile device, the OS may be a mobile OS, such as Android® provided by Google iOS® provided by Apple Inc.®, Windows 10 Mobile® provided by Microsoft Corp.®, KaiOS provided by KaiOS Technologies Inc., or the like. The OS manages computer hardware and software resources, and provides common services for various applications (e.g., application 202, KDF 200, KDF 200, etc.). The OS may include one or more drivers or APIs that operate to control particular devices that are embedded in the system 600, attached to the system 600, or otherwise communicatively coupled with the system 600. The drivers may include individual drivers allowing other components of the system 600 to interact or control various I/O devices that may be present within, or connected to, the system 600. For example, the drivers may include a display driver to control and allow access to a display device, a touchscreen driver to control and allow access to a touchscreen interface of the system 600, sensor drivers to obtain sensor readings of sensor circuitry 621 and control and allow access to sensor circuitry 621, actuator drivers to obtain actuator positions of the actuators 622 and/or control and allow access to the actuators 622, a camera driver to control and allow access to an embedded image capture device, audio drivers to control and allow access to one or more audio devices. The OSs may also include one or more libraries, drivers, APIs, firmware, middleware, software glue, etc., which provide program code and/or software components for one or more applications to obtain and use the data from other applications operated by the system 600.

In an example, the instructions 682 provided via the memory circuitry 604 and/or the storage circuitry 608 are embodied as a non-transitory, machine-readable medium S60 including code to direct the processor circuitry 602 to perform electronic operations in the system 600. The processor circuitry 602 accesses the non-transitory machine-readable medium 660 over the interconnect (IX) 606. For instance, the non-transitory, machine-readable medium 660 may be embodied by devices described for the storage circuitry 608 of FIG. 6 or may include specific storage units such as optical disks, flash drives, or any number of other hardware devices. The non-transitory, machine-readable medium 660 may include instructions 682 to direct the processor circuitry 602 to perform a specific sequence or flow of actions, for example, as described with respect to the flowchart(s) and block diagram(s) of operations and functionality depicted previously (see e.g., FIGS. 4-5). In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., EPROM, EEPROM) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP). In alternate embodiments, the programming instructions may be disposed on multiple computer-readable non-transitory storage media instead. In still other embodiments, the programming instructions may be disposed on computer-readable transitory storage media, such as, signals.

The components of system 600 communicate with one another over the interconnect (IX) 606. The IX 606 may include any number of IX technologies such as industry standard architecture (ISA), extended ISA (EISA), inter-integrated circuit (I²C), an serial peripheral interface (SPI), point-to-point interfaces, power management bus (PMBus), peripheral component interconnect (PCI), PCI express (PCIe), Intel® Ultra Path Interface (UPI), Intel® Accelerator Link (IAL), Common Application Programming Interface (CAPI), Intel® QuickPath Interconnect (QPI), Intel® Omni-Path Architecture (OPA) IX, RapidIO™ system interconnects, Ethernet, Cache Coherent Interconnect for Accelerators (CCIA), Gen-Z Consortium IXs, Open Coherent Accelerator Processor Interface (OpenCAPI), and/or any number of other IX technologies. The IX 606 may be a proprietary bus, for example, used in a SoC based system.

The communication circuitry 609 is a hardware element, or collection of hardware elements, used to communicate over one or more networks (e.g., network 61) and/or with other devices. The communication circuitry 609 includes modem 610 and transceiver circuitry ("TRx") 612. The modem 610 includes one or more processing devices (e.g., baseband processors) to carry out various protocol and radio control functions. Modem 610 may interface with application circuitry of system 600 (e.g., a combination of processor circuitry 602 and CRM 660) for generation and processing of baseband signals and for controlling operations of the TRx 612. The modem 610 may handle various radio control functions that enable communication with one or more radio networks via the TRx 612 according to one or more wireless communication protocols. The modem 610 may include circuitry such as, but not limited to, one or more single-core or multi-core processors (e.g., one or more baseband processors) or control logic to process baseband signals received from a receive signal path of the TRx 612, and to generate baseband signals to be provided to the TRx 612 via a transmit signal path. In various embodiments, the modem 610 may implement a real-time OS (RTOS) to manage resources of the modem 610, schedule tasks, etc.

The communication circuitry 609 also includes TRx 612 to enable communication with wireless networks using modulated electromagnetic radiation through a non-solid medium. TRx 612 includes a receive signal path, which comprises circuitry to convert analog RF signals (e.g., an existing or received modulated waveform) into digital baseband signals to be provided to the modem 610. The TRx 612 also includes a transmit signal path, which comprises circuitry configured to convert digital baseband signals provided by the modem 610 to be converted into analog RF signals (e.g., modulated waveform) that will be amplified and transmitted via an antenna array including one or more antenna elements (not shown). The antenna array may be a plurality of microstrip antennas or printed antennas that are fabricated on the surface of one or more printed circuit boards. The antenna array may be formed in as a patch of metal foil (e.g., a patch antenna) in a variety of shapes, and may be coupled with the TRx 612 using metal transmission lines or the like. The TRx 612 may include one or more radios that are compatible with, and/or may operate according to any one or more of the radio communication technologies and/or standards, such as those discussed herein.

Network interface circuitry/controller (NIC) 616 may be included to provide wired communication to the network 61 or to other devices, such as the mesh devices 664 using a standard network interface protocol. The standard network interface protocol may include Ethernet, Ethernet over GRE Tunnels, Ethernet over Multiprotocol Label Switching (MPLS), Ethernet over USB, or may be based on other types of network protocols, such as Controller Area Network (CAN), Local Interconnect Network (LIN), DeviceNet, ControlNet, Data Highway+, PROFIBUS, or PROFINET, among many others. Network connectivity may be provided to/from the system 600 via NIC 616 using a physical connection, which may be electrical (e.g., a "copper interconnect") or optical. The physical connection also includes suitable input connectors (e.g., ports, receptacles, sockets, etc.) and output connectors (e.g., plugs, pins, etc.). The NIC 616 may include one or more dedicated processors and/or FPGAs to communicate using one or more of the aforementioned network interface protocols. In some implementations, the NIC 616 may include multiple controllers to provide connectivity to other networks using the same or different protocols. For example, the system 600 may include a first NIC 616 providing communications to the cloud over Ethernet and a second NIC 616 providing communications to other devices over another type of network.

In some implementations, the NIC 616 may be a high-speed serial interface (HSSI) NIC to connect the system 600 to a routing or switching device.

The external interface 618 (also referred to as "I/O interface circuitry" or the like) is configured to connect or couple the system 600 with external devices or subsystems. The external interface 618 may include any suitable interface controllers and connectors to couple the system 600 with the external components/devices. As an example, the external interface 618 may be an external expansion bus (e.g., USB, FireWire, Thunderbolt, etc.) used to connect system 60 with external (peripheral) components/devices. The external devices include, inter alia, sensor circuitry 621, actuators 622, and positioning circuitry 645, but may also include other devices or subsystems not shown by FIG. 6.

The sensor circuitry 621 may include devices, modules, or subsystems whose purpose is to detect events or changes in its environment and send the information (sensor data) about the detected events to some other a device, module, subsystem, etc. Examples of such sensors 621 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like), depth sensors, ambient light sensors, ultrasonic transceivers; microphones; etc.

The external interface 618 connects the system 600 to actuators 624, allow system 600 to change its state, position, and/or orientation, or move or control a mechanism or system. The actuators 622 comprise electrical and/or mechanical devices for moving or controlling a mechanism or system, and converts energy (e.g., electric current or moving air and/or liquid) into some kind of motion. The actuators 622 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 622 may include one or more electromechanical devices such as pneumatic actuators, hydraulic actuators, electromechanical switches including electromechanical relays (EMRs), motors (e.g., DC motors, stepper motors, servomechanisms, etc.), wheels, thrusters, propellers, claws, clamps, hooks, an audible sound generator, and/or other like electromechanical components. The system 600 may be configured to operate one or more actuators 622 based on one or more captured events and/or instructions or control signals received from a service provider and/or various client systems. In embodiments, the system 600 may transmit instructions to various actuators 622 (or controllers that control one or more actuators 622) to reconfigure an electrical network as discussed herein.

The positioning circuitry 645 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 645 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 645 may include a Micro-Technology for Positioning, Navigation, and Timing (Micro-PNT) IC that uses a master timing clock to perform position tracking/estimation without GNSS assistance. The positioning circuitry 645 may also be part of, or interact with, the communication circuitry 609 to communicate with the nodes and components of the positioning network. The positioning circuitry 645 may also provide position data and/or time data to the application circuitry, which may use the data to synchronize operations with various infrastructure (e.g., radio base stations), for turn-by-turn navigation, or the like.

The input/output (I/O) devices 686 may be present within, or connected to, the system 600. The I/O devices 686 include input device circuitry and output device circuitry including one or more user interfaces designed to enable user interaction with the system 600 and/or peripheral component interfaces designed to enable peripheral component interaction with the system 600. The input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry is used to show or convey information, such as sensor readings, actuator position(s), or other like information. Data and/or graphics may be displayed on one or more user interface components of the output device circuitry. The output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the system 600. The output device circuitry may also include speakers or other audio emitting devices, printer(s), and/or the like. In some embodiments, the sensor circuitry 621 may be used as the input device circuitry (e.g., an image capture device, motion capture device, or the like) and one or more actuators 622 may be used as the output device circuitry 684 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

A battery 624 may be coupled to the system 600 to power the system 600, which may be used in embodiments where the system 600 is not in a fixed location, such as when the system 600 is a mobile or laptop computer. The battery 624 may be a lithium ion battery, a lead-acid automotive battery, or a metal-air battery, such as a zinc-air battery, an aluminum-air battery, a lithium-air battery, a lithium polymer battery, and/or the like. In embodiments where the system 600 is mounted in a fixed location, such as when the system is implemented as a server computer system, the system 600 may have a power supply coupled to an electrical grid. In these embodiments, the system 600 may include power tee circuitry to provide for electrical power drawn from a network cable to provide both power supply and data connectivity to the system 600 using a single cable.

Power management integrated circuitry (PMIC) 626 may be included in the system 600 to track the state of charge (SoCh) of the battery 624, and to control charging of the system 600. The PMIC 626 may be used to monitor other parameters of the battery 624 to provide failure predictions, such as the state of health (SoH) and the state of function (SoF) of the battery 624. The PMIC 626 may include voltage regulators, surge protectors, power alarm detection circuitry. The power alarm detection circuitry may detect one or more of brown out (under-voltage) and surge (over-voltage) conditions. The PMIC 626 may communicate the information on the battery 624 to the processor circuitry 602 over the IX 606. The PMIC 626 may also include an analog-to-digital (ADC) convertor that allows the processor circuitry 602 to directly monitor the voltage of the battery 624 or the current flow from the battery 624. The battery parameters may be used to determine actions that the system 600 may perform, such as transmission frequency, mesh network operation, sensing frequency, and the like.

A power block 628, or other power supply coupled to an electrical grid, may be coupled with the PMIC 626 to charge the battery 624. In some examples, the power block 628 may be replaced with a wireless power receiver to obtain the power wirelessly, for example, through a loop antenna in the system 600. In these implementations, a wireless battery charging circuit may be included in the PMIC 626. The specific charging circuits chosen depend on the size of the battery 624 and the current required.

The system 600 may include any combinations of the components shown by FIG. 6, however, some of the components shown may be omitted, additional components may be present, and different arrangement of the components shown may occur in other implementations. In one example where the system 600 is or is part of a server computer system, the battery 624, communication circuitry 609, the sensors 621, actuators 622, and/or POS 645, and possibly some or all of the I/O devices 686 may be omitted.

Some non-limiting examples are provided infra.

{to be added later}

Any of the above-described examples may be combined with any other example (or combination of examples), unless explicitly stated otherwise.

In the preceding detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous. Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an ASIC, a FPGA, PLD, SoC, SiP, MCP, DSP, etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry. The term "module" may refer to, be part of, or include an FPGA, ASIC, PLD, SoC, SiP, MCP, a processor (shared, dedicated, or group) and/or memory (shared, dedicated, or group) that execute one or more software or firmware programs, a combinational logic circuit, and/or other suitable components that provide the described functionality.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" as used herein refers to one or more hardware devices for storing data, including RAM, magnetoresistive RAM, phase change RAM (PRAM), DRAM and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data. The term "interface circuitry" as used herein refers to, is part of, or includes circuitry that enables the exchange of information between two or more components or devices. The term "interface circuitry" may refer to one or more hardware interfaces, for example, buses, IO interfaces, peripheral component interfaces, network interface cards, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "architecture" as used herein refers to a computer architecture or a network architecture. A "network architecture" is a physical and logical design or arrangement of software and/or hardware elements in a network including communication protocols, interfaces, and media transmission. A "computer architecture" is a physical and logical design or arrangement of software and/or hardware elements in a computing system or platform including technology standards for interacts therebetween.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource. The term "gateway" as used herein refers to a network appliance that allows data to flow from one network to another network, or a computing system or application configured to perform such tasks. Examples of gateways may include IP gateways, Internet-to-Orbit (120) gateways, IoT gateways, cloud storage gateways, and/or the like. The term "element" refers to a unit that is indivisible at a given level of abstraction and has a clearly defined boundary, wherein an element may be any type of entity including, for example, one or more devices, systems, controllers, network elements, modules, etc., or combinations thereof. The term "device" refers to a physical entity embedded inside, or attached to, another physical entity in its vicinity, with capabilities to convey digital information from or to that physical entity. The term "entity" refers to a distinct component of an architecture or device, or information transferred as a payload. The term "controller" refers to an element or entity that has the capability to affect a physical entity, such as by changing its state or causing the physical entity to move.

As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of wireless communications protocols may be used in various embodiments include cellular communication technology such as Third Generation Partnership Project (3GPP) Fifth Generation (5G) or New Radio (NR) and 3GPP Long Term Evolution (LTE), WiFi® Worldwide Interoperability for Microwave Access (WiMAX), or the like; Wireless Local Area Network (WLAN) or Wi-Fi® based technology IEEE 802.11 based protocol (e.g., IEEE 802.11ad, IEEE 802.11ay, etc.), Wireless Gigabit Alliance (WiGig), and the like; a device-to-device or personal area network (PAN) technology such as Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, etc.) WiFi-direct, ANT/ANT+, ZigBee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, a Low-Power Wide Area Network (LPWAN) such as those provided by Sigfox®; V2X communication technologies including 3GPP Cellular V2X, Dedicated Short Range Communications (DSRC) communication systems or Intelligent-Transport-Systems (ITS); among many others. The examples provided herein are thus understood as being applicable to various other communication technologies, both existing and not yet formulated.

As used herein, the terms "instantiate," "instantiation," and the like may refer to the creation of an instance, and an "instance" may refer to a concrete occurrence of an object, which may occur, for example, during execution of program code. As used herein, a "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and database entities (also referred to as a "relation"), and the like. The term "document" may refer to a computer file or resource used to record data, and includes various file types or formats such as word processing, spreadsheet, slide presentation, multimedia items, and the like. As used herein, the term "resource" refers to any identifiable physical, virtual/digital, or abstract object that are capable of being obtained or accessed over a network such as the Internet using a resource identifier (e.g., a uniform resource locator (URL), uniform resource identifier (URI), or the like).

Cloud computing refers to a paradigm for enabling network access to a scalable and elastic pool of shareable computing resources with self-service provisioning and administration on-demand and without active management by users. Computing resources are any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. Cloud computing provides cloud computing services (or cloud services), which are one or more capabilities offered via cloud computing that are invoked using a defined interface (e.g., an API or the like).

As used herein, the term "device" may refer to a physical entity embedded inside, or attached to, another physical entity in its vicinity, with capabilities to convey digital information from or to that physical entity. As used herein, the term "element" may refer to a unit that is indivisible at a given level of abstraction and has a clearly defined boundary, wherein an element may be any type of entity. As used herein, the term "controller" may refer to an element or entity that has the capability to affect a physical entity, such as by changing its state or causing the physical entity to move. As used herein, the term "entity" may refer to (1) a distinct component of an architecture or device, or (2) information transferred as a payload.

As used herein, the term "computer system" refers to any type interconnected electronic devices, computer devices, or components thereof. Additionally, the term "computer system" and/or "system" may refer to various components of a computer that are communicatively coupled with one another, or otherwise organized to accomplish one or more functions. Furthermore, the term "computer system" and/or "system" may refer to multiple computer devices and/or multiple computing systems that are communicatively coupled with one another and configured to share computing and/or networking resources. Additionally, the terms "computer system" may be considered synonymous to, and may hereafter be occasionally referred to, as a computer device, computing device, computing platform, client device, client, mobile, mobile device, user equipment (UE), terminal, receiver, server, etc., and may describe any physical hardware device capable of sequentially and automatically carrying out a sequence of arithmetic or logical operations; equipped to record/store data on a machine readable medium; and transmit and receive data from one or more other devices in a communications network. The term "computer system" may include any type of electronic devices, such as a cellular phone or smart phone, tablet personal computer, wearable computing device, an autonomous sensor, laptop computer, desktop personal computer, a video game console, a digital media player, a handheld messaging device, a personal data assistant, an electronic book reader, an augmented reality device, server computer device(s) (e.g., stand-alone, rack-mounted, blade, etc.), and/or any other like electronic device.

The term "server" as used herein refers to a computing device or system, including processing hardware and/or process space(s), an associated storage medium such as a memory device or database, and, in some instances, suitable application(s) as is known in the art. The terms "server system" and "server" may be used interchangeably herein. that provides access to a pool of physical and/or virtual resources. The various servers discussed herein include computer devices with rack computing architecture component(s), tower computing architecture component(s), blade computing architecture component(s), and/or the like. The servers may represent a cluster of servers, a server farm, a cloud computing service, or other grouping or pool of servers, which may be located in one or more datacenters. The servers may also be connected to, or otherwise associated with one or more data storage devices (not shown). Moreover, the servers may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

The invention claimed is:

1. One or more non-transitory computer-readable storage media (NTCRSM) comprising instructions, wherein execution of the instructions by a processing device is to cause a computing system to:
   render a graphical user interface (GUI) for interacting with a service provider platform (SPP) in a client application (app), the GUI comprising a set of slots, each slot of the set of slots is defined by a set of tags and each slot at least includes content;
   identify one or more resources within each slot;
   determine at least one advertisement (ad) resource of the identified one or more resources based on a comparison of the at least one ad resource with a stored set of ad indicators, the at least one ad resource being a resource sourced from or hosted by an entity different than the SPP, and the ad indicators indicate known ad resources;
   identify at least one ad slot among the set of slots, the at least one ad slot being a slot that at least includes a reference to the at least one ad resource;
   apply an obfuscation effect to an entirety of the at least one ad slot without disabling references to ad resources within the at least one ad slot; and
   remove the obfuscation effect from the obfuscated at least one ad slot in response to detection of a hover of a cursor over the obfuscated the at least one ad slot.

2. The one or more NTCRSM of claim 1, wherein execution of the instructions is to cause the computing system to:
   obtain a web document including instructions for generation and rendering the GUI in the client app; and
   identify the resources within each slot in the obtained web document.

3. The one or more NTCRSM of claim 1, wherein each ad indicator of the set of ad indicators includes a distinction intensity value, and execution of the instructions is to cause the computing system to:
   adjust the obfuscation effect to be applied to the at least one ad slot based on the distinction intensity value of an ad indicator of the set of ad indicators corresponding to the determined at least one ad slot.

4. The one or more NTCRSM of claim 3, wherein the distinction intensity value is a weight factor, and, to adjust the obfuscation effect, execution of the instructions is to cause the computing system to:
adjust an extent to which the obfuscation effect increases or decreases between a center of the at least one ad slot and edges of the at least one ad slot.

5. The one or more NTCRSM of claim 3, wherein the distinction intensity value is a scaling factor, and, to adjust the obfuscation effect, execution of the instructions is to cause the computing system to:
apply the scaling factor to a default or predefined distinction intensity value.

6. The one or more NTCRSM of claim 1, wherein, to apply the obfuscation effect, execution of the instructions is to cause the computing system to:
inject distinction code into a portion of source code of the GUI associated with the at least one ad slot or the at least one ad resource, the distinction code to instruct the client app to generate and render the obfuscation effect on the at least one ad slot.

7. The one or more NTCRSM of claim 6, wherein the obfuscation effect is among a plurality of obfuscation effects, each ad indicator further indicates an obfuscation effect of the plurality of obfuscation effects, and the distinction code includes a function for causing the indicated obfuscation effect on the at least one ad slot.

8. The one or more NTCRSM of claim 1, wherein execution of the instructions is to cause the computing system to:
store the set of ad indicators in a local caching system.

9. A computing system comprising:
processor circuitry coupled with network interface circuitry (NIC), wherein:
the NIC is configurable to: obtain, from a remote service provider platform (SPP), an electronic document including source code for generating and rendering a webpage or web application (app) in a client app; and
the processor circuitry is configurable to operate the client app to: generate and render the webpage or web app in the client app, the webpage or web app comprising a set of slots, each slot of the set of slots is defined by a set of tags and each slot at least includes content, and
the processor circuitry is configurable to operate a component to:
identify one or more resources referenced in each slot based on the source code;
determine at least one ad resource of the identified one or more resources, the at least one ad resource being a resource served from an entity different than the SPP;
identify at least one ad slot among the set of slots, the at least one ad slot being a slot that at least includes a reference to the at least one ad resource;
apply an obfuscation effect to an entirety of the at least one ad slot without disabling references to ad resources within the at least one ad slot;
detect a hover over the obfuscated at least one ad slot with a pointer; and
remove the obfuscation effect from the obfuscated at least one ad slot in response to detection of the hover.

10. The computing system of claim 9, wherein, to determine the at least one ad resource, the processor circuitry is configurable to operate the component to:
compare the at least one ad resource with a stored set of ad indicators, each of the stored set of ad indicators indicating known ad resources.

11. The computing system of claim 10, wherein, to compare the at least one ad resource with a stored set of ad indicators, the processor circuitry is configurable to operate the component to:
compare a portion of a resource identifier of the at least one ad resource with resource identifiers indicated by at least some of the ad indicators of the stored set of ad indicators.

12. The computing system of claim 9, wherein each ad indicator of the set of ad indicators includes a distinction indicator, and each distinction indicator includes a distinction intensity value, and the processor circuitry is configurable to operate the component to:
adjust the obfuscation effect applied to the at least one ad slot based on the distinction intensity value.

13. The computing system of claim 12, wherein, to adjust the obfuscation effect, the processor circuitry is configurable to operate the component to:
apply the distinction intensity value to an obfuscation effect function, wherein the obfuscation effect function is to increase or decrease the obfuscation effect to be applied to the at least one ad slot according to the distinction intensity value.

14. The computing system of claim 12, wherein the distinction intensity value is a scaling factor, and, to adjust the obfuscation effect, the processor circuitry is configurable to operate the component to:
apply the scaling factor to a default distinction intensity value; and
apply the scaled distinction intensity value to an obfuscation effect function, wherein the obfuscation effect function is to increase or decrease the obfuscation effect of the at least one ad slot according to the distinction intensity value.

15. The computing system of claim 9, wherein, to apply the obfuscation effect to the at least one ad slot, the processor circuitry is configurable to operate the component to:
inject obfuscation effect code into a portion of source code of the electronic document associated with the at least one ad slot, the obfuscation effect code to instruct the client app to generate and render the at least one ad slot with the obfuscation effect.

16. The computing system of claim 12, wherein the obfuscation effect is among a plurality of obfuscation effects, a distinction indicator further indicates the obfuscation effect, and the obfuscation effect code includes a function for causing the indicated obfuscation effect on the at least one ad slot.

17. The computing system of claim 16, wherein the plurality of obfuscation effects include a shadow effect, a redaction effect, a blurring effect, inserting a graphic at the at least one ad slots, and inserting an animation at the at least one ad slots.

18. The computing system of claim 9, wherein the client app is a web browser and the component is a plugin or browser extension of the web browser, or the client app is a desktop application and the component is a separate application capable of communicating with the desktop application.

* * * * *